United States Patent [19]
Lai et al.

[11] Patent Number: 5,511,152
[45] Date of Patent: Apr. 23, 1996

[54] MEMORY SUBSYSTEM FOR BITMAP PRINTER DATA CONTROLLER

[75] Inventors: Charles C. Lai, Marlboro; Wayne R. Bortman, Westford, both of Mass.

[73] Assignee: Digital Equipment Corporation, Maynard, Mass.

[21] Appl. No.: 124,177

[22] Filed: Sep. 20, 1993

[51] Int. Cl.$^6$ ............................................. G06K 15/00
[52] U.S. Cl. .............................. 395/115; 395/114
[58] Field of Search ............................ 395/115, 116, 395/119, 105, 101; 364/519; G06K 15/00

[56] References Cited

U.S. PATENT DOCUMENTS

| | | | |
|---|---|---|---|
| 4,809,216 | 2/1989 | Lai ........................................... | 364/900 |
| 4,890,226 | 12/1989 | Itoh .......................................... | 364/200 |
| 4,992,956 | 2/1991 | Kaku et al. .............................. | 364/519 |
| 5,197,117 | 3/1993 | Kato et al. ............................... | 395/105 |
| 5,199,101 | 3/1993 | Cusick et al. ........................... | 395/115 |
| 5,220,645 | 6/1993 | Nakajima ................................ | 395/115 |
| 5,239,621 | 8/1993 | Brown, III et al. ..................... | 395/115 |
| 5,253,081 | 10/1993 | Shoji et al. .............................. | 358/450 |
| 5,299,310 | 3/1994 | Motoyama ............................... | 395/116 |
| 5,341,471 | 8/1994 | Yamazaki et al. ...................... | 395/164 |
| 5,347,368 | 9/1994 | Mochizuki ............................... | 358/296 |
| 5,375,204 | 12/1994 | Motoyama et al. ..................... | 395/101 |
| 5,377,311 | 12/1994 | Carlick et al. ........................... | 395/114 |

*Primary Examiner*—Mark R. Powell
*Assistant Examiner*—Steven P. Sax
*Attorney, Agent, or Firm*—Mary M. Steubing; Ronald C. Hudgens

[57] ABSTRACT

A DRAM memory controller for a printer having a single host CPU and a bitmap memory. The CPU initiates data transfers synchronously to a system clock for filling the bitmap memory, and a DMA controller initiates data transfers asynchronously to the system clock for transferring data from the bitmap memory to a print engine. The controller includes a first sequencer for controlling synchronous data transfers initiated by the host CPU, a second sequencer for controlling asynchronous data transfers initiated by the DMA controller, a refresh request generator for generating a refresh request signal which is asynchronous to the system clock, and a third sequencer for controlling memory refresh and for controlling arbtitration betwween the first, second, and third sequencers. Also provided is a method of transferring data between a bitmap memory and a print fifo in a printer. The method includes the steps of initiating a single data write transfer to a location in a dynamic RAM; reading a word of data from the location in the dynamic RAM to a first buffer using a first page-mode DRAM access; and writing data from a second buffer to the same location in the dynamic RAM using a second page-mode DRAM access.

5 Claims, 16 Drawing Sheets

MEMORY SUBSYSTEM FOR BITMAP PRINTER DATA CONTROLLER

BACKGROUND OF THE INVENTION

The invention relates to bit map scanning devices, and particularly to bitmap memories and controllers for laser printers.

Bit map scanning devices, such as laser printers, process data defining a two-dimensional element-by-element map of an image for printing or displaying. Such scanning devices typically employ a raster scanning technique, in which images are defined by lines of picture elements (pixels), scanned one line at a time.

Many laser printers employ a bitmap memory in which an image is composed pixel by pixel and then sequentially scanned and synchronously sent to the imaging print engine. One advantage of the bitmap technique is that no data will be missing on a printed page due to a lack of processing power, because every image is completely composed before it prints. Modern laser printers, however, have resolutions on the order of 300 to 600 dots per inch (DPI). Very large amounts of memory are required to implement bitmaps at these resolutions: for example, an A4 sized page at 300 DPI consumes at least 1 megabyte of memory. Furthermore, the bitmap memory must be processed at a very high rate of speed to keep up with the raster scanner. In addition, the bitmap memory must be capable of being nearly simultaneously filled with picture element data by an image generating processor while a print engine controller scans the data out of the bitmap to be serialized and forwarded to the print engine. There should also be provided some means for refreshing the bitmap memory to guarantee data retention. All of these factors lead to complexity in the implementation of bitmap controllers.

There are several approaches to implementing bitmap memory controllers. On the high performance end, graphic pipeline architectures using multi-stage processors are employed. A system CPU and a system memory are provided for handling system operations. Multiple pages of dual port bitmap memory are also provided, separate from the system memory. The bitmap memory is directly connected to the output of a graphic processor, which performs graphic and bitmap manipulations separately and in parallel with system CPU operations. Such implementations maximize bitmap memory bandwidth thereby providing very high performance; however, they are very expensive.

Lower cost, lower performance implementations employ a general purpose microprocessor system. The system CPU performs general purpose operations as well as graphic and bitmap manipulations, and part of the system memory is allocated to store the bitmap data. Since there are no other processors to share the workload, the system and memory busses are subjected to huge flows of bitmap data, greatly restricting printer performance and rendering such implementations undesirable.

A more particular problem affecting laser printer bitmap controllers involves high speed clearing of the bitmap. Printers supporting certain algorithms such as Postscript® are required to clear (or write to binary '0') the bitmap after a page has been scanned out in order to facilitate the writing of a new page. Clearing large amounts of memory takes a significant amount of time, thus contributing to performance problems. The complexity of bitmap controllers is further increased where high speed bitmap clearing modes are implemented.

It would be advantageous to provide a low cost printer employing a single general purpose microprocessor architecture which also provides high performance. In particular, it is desirable to implement a bitmap memory controller for a single processor system which allows efficient and high speed control of bitmap refresh and dual port accesses, while providing a fast and efficient means for clearing the bitmap.

SUMMARY OF THE INVENTION

In accordance with the present invention, there is provided a DRAM memory controller for a printer having a single host CPU. The CPU provides a system clock and a state signal representing a CPU internal state. The CPU initiates data transfers synchronously to the system clock. The printer also includes a DMA controller for initiating data transfers asynchronously to the system clock.

The DRAM memory controller comprises a first sequencer for providing first timing signals in response to data transfers initiated by the host CPU. The first sequencer comprises a synchronous state machine using the system clock and responsive to the state signal. The DRAM memory controller also comprises a second sequencer for providing second timing signals in response to data transfers initiated by the DMA controller. The second sequencer also comprises a synchronous state machine using the system clock. The DRAM memory controller further comprises a refresh request generator for generating a refresh request signal which is asynchronous to the system clock. Also included is a third sequencer for providing third timing signals in response to the refresh request signal. The third sequencer comprises a synchronous state machine using the system clock and responsive to the state signal, and provides for arbitration between the first, second, and third sequencers so that the first timing signals, second timing signals, and third timing signals are not activated simultaneously. Finally included is a signal generator for providing DRAM control signals in response to the first timing signals, second timing signals, and third timing signals.

According to a further aspect of the invention, the DRAM memory controller further includes a memory data bus for coupling the DRAM memory controller to a DRAM memory, a print fifo data latch coupled to the memory data bus, a pattern register coupled to the memory data bus, and memory data transceivers for coupling the DRAM memory controller to the host cpu and to the DMA controller. Means is provided for controlling the memory data transceivers such that when the host CPU or the DMA controller executes a write to a location in the DRAM memory, the DRAM memory controller may execute a read from the DRAM memory location to the print fifo data latch followed by a write from the pattern register to the DRAM memory location without bus contention between the memory controller and the host CPU or the DMA controller.

According to another aspect of the invention, there is provided a method of transferring data between a bitmap memory and a print fifo in a printer. The method comprises the steps of initiating a single data write transfer to a location in a dynamic RAM; reading a word of data from the location in the dynamic RAM to a first buffer using a first page-mode DRAM access; writing data from a second buffer to the same location in the dynamic RAM using a second page-mode DRAM access; and terminating the data write transfer.

The present invention provides a low cost, high performance bitmap memory controller for controlling the various types of memory accesses initiated by the host CPU and print engine controller in a single processor printer architecture, and for controlling refresh of the memory. The invention also provides a simple and high performance method of scan-erasing a printer bitmap.

BRIEF DESCRIPTION OF THE DRAWINGS

FIG. 12 (b) is a timing diagram of a multiple longword DMA access;

DETAILED DESCRIPTION OF THE PREFERRED EMBODIMENT

The invention is described with reference to the following exemplary embodiment, where signal names represent asserted signals, signal names preceded by '/' represent deasserted signals, and all timing diagrams represent control signals asserted in a low or binary '0' state.

Figure 1:
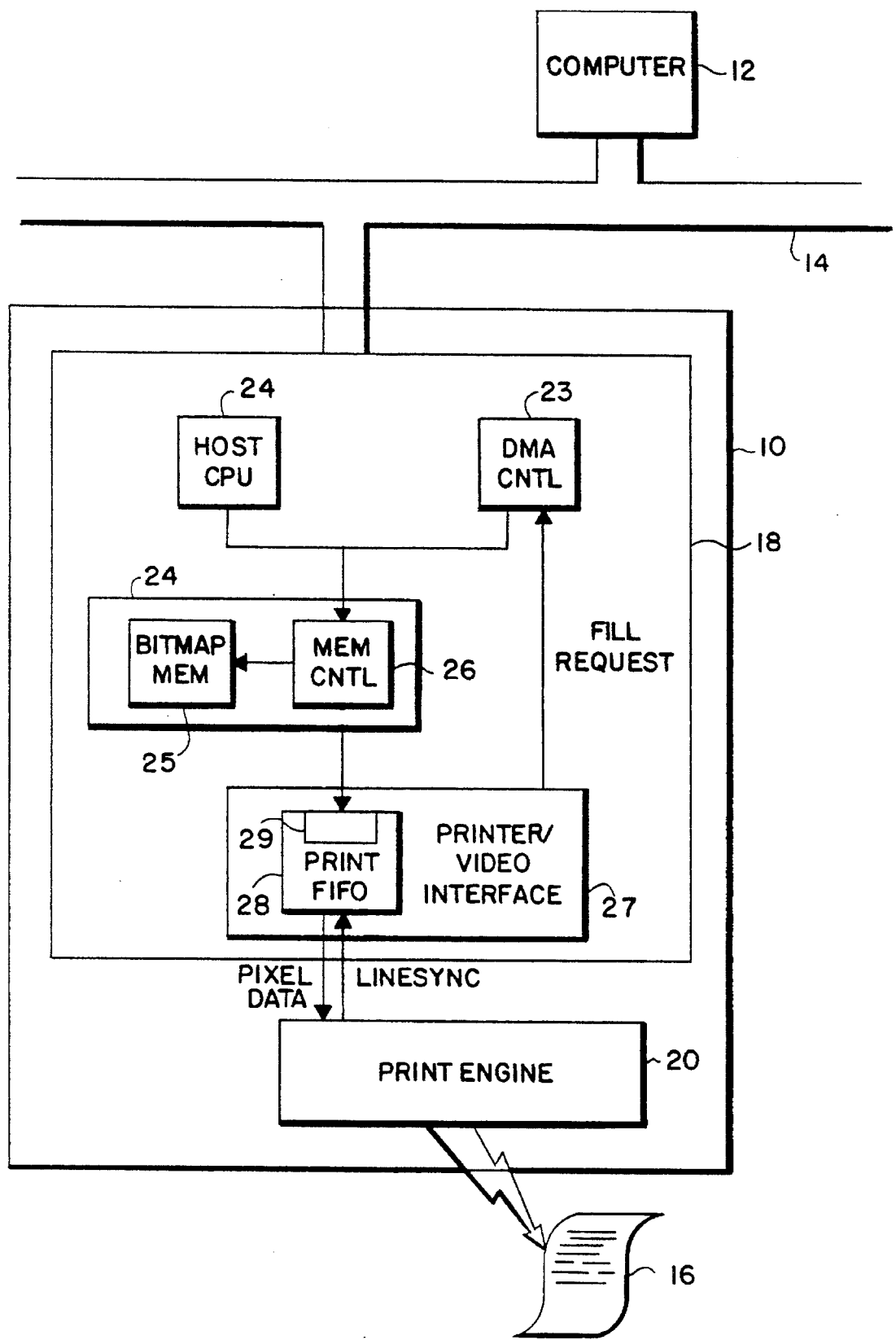
FIG. 1 is a block diagram of a laser printer embodying the principles of the invention.

In FIG. 1 there is shown a block diagram of a laser printer system 10 that is connected to a computer 12 through a main bus 14 such as an ethernet® line. Packets of data are transferred from the computer 12 over the main bus 14 to the printer system 10, which manipulates the data to produce a printed document 16. The print system 10 is shown to further include a print system controller 18 and a print engine 20. The print system controller 18 further includes a host cpu 22, a printer DMA controller 23, a memory subsystem 24 including memory 25 and memory controller 26, and a printer/video interface 27 including a print fifo 28 having a fifo data latch 29.

The host CPU 22 responds to packets of data received from the computer 12 by generating pixel images which are stored as bitmap data in the memory 25. The bitmap data contains a representation of the printed page to be produced. The memory 25 therefore necessitates the use of a large amount of memory: for example, at least one megabyte of memory is required to store a 300 DPI A-size image bitmap.

The memory 25 is also coupled to the printer/video interface 27. Bitmap data is transferred, or scanned, from the memory 25 to the print fifo 28 within the printer/video interface 27. It is then serialized in the printer/video inverface 27 to provide pixel data to the print engine 22. The print engine 22 controls the laser and other hardware necessary to produce the printed document 16. According to an aspect of the invention, as a word of bitmap data is scanned from the memory 25 to the print fifo 28, the location in the memory 25 containing the word is cleared to a binary '0' so that new bitmap data may be written into the location. The scanning and clearing of the memory 25 location is hereafter referred to as a "scan-erase" cycle.

The transmission of data between the memory 25, the print fifo 28, and the print engine 22 is controlled in part by the printer/video interface 27. The print engine 22 transmits a line sync signal to the printer/video interface 27 whenever it is ready to start a new scan line. In response to the line sync signal 28, the printer/video interface 27 initiates the transfer of data from the print fifo 28 to the print engine 22. When the print fifo 28 has emptied beyond a certain predetermined point, the printer/video interface 27 generates a fill request signal to the printer DMA controller 23, which in turn initiates the transfer of data from the memory 25 to the print fifo 28.

It can be seen that the memory 25 is subject to a variety of types of memory accesses. Bitmap data is written to the memory 25 by the host CPU 22 in response to packets received from the computer 12. The memory 25 is also used for general purpose computing by the host CPU 22. Meanwhile, the bitmap data is read via DMA into the print fifo 28 in response to the fill request signal from the printer/video interface 27. The memory 25 may be further subject to other types of DMA transfers; for example, due to CCITT decompression. In addition, the memory 25 is cyclically refreshed to ensure retention of the data therein. The cyclical refreshing of the memory 25 also allows repeated scanning of the bitmap data to produce multiple copies of the same printed page without having to re-compose the page.

Figure 2:
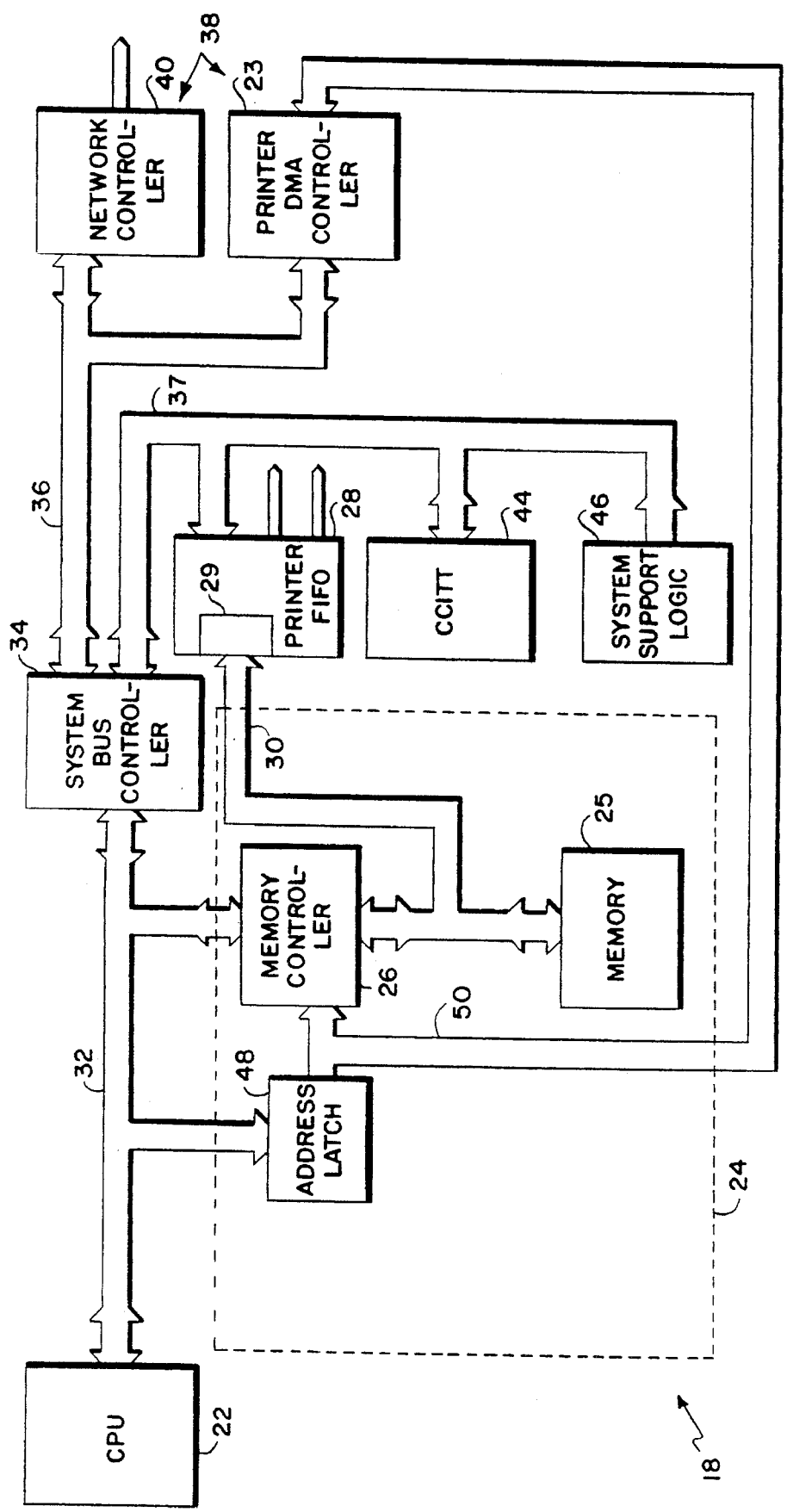
FIG. 2 is a block diagram of the printer controller of FIG. 1, including a memory subsystem according to the principles of the invention.

Referring now to FIG. 2 there is shown the printer system controller 18 in further detail. The printer system controller 18 includes the host CPU 22 and a memory subsystem 24 including the memory 25 and, according to the principles of the invention, the memory controller 26. The memory controller 26 is coupled to the memory 25 via a memory data bus 30, and the host CPU 22 is coupled to the memory controller 26 via a multiplexed CPU bus 32.

Also coupled to the CPU bus 32 is a system bus controller 34, which couples the CPU bus 32 to a buffered system bus 36 and an I/O bus 37. The buffered system bus 36 supports various DMA controllers 38 capable of gaining control of the system bus 36 and CPU bus 32 and acting as a bus master. One such DMA controller 38 is a network controller 40, which transfers data packets between the computer 12 and the host CPU 22. Another such DMA controller 38 is the printer DMA controller 23 (FIG. 1). The printer DMA controller 23 initiates transfers between the memory 25 and the print fifo 28 in response to the fill request signal from the printer/video interface 27. Both the network controller 40 and the printer DMA controller 23 are DMA controllers capable of gaining bus control from the host CPU 22.

The print fifo 28 is coupled to the I/O bus 38, as are other peripheral components such as CCITT decompression logic 44 and system support logic 46. The print fifo 28 is further coupled to the fifo data latch 29, which is coupled to the memory subsystem 24 via the memory bus 48.

The memory subsystem 24 is shown in further detail to contain the memory controller 26 coupled to the CPU bus 32. An address latch 48 is also coupled to the CPU bus 32, and feeds latched address signals 50 to the memory controller 26 and to the printer DMA controller 23. The memory controller 26, the memory 25, and the fifo data latch 29 are all coupled together via the memory data bus 30.

In operation, access to the memory 25 occurs as one of three types. According to a first type of memory 25 access, hereafter referred to as a synchronous access, the host CPU 22 reads from or writes to the memory 25 via the system bus 32 and the memory bus 30. Such an access occurs, for example, when the host CPU 22 is filling the memory 25 with an image to be printed to the printed document 16. This type of access occurs synchronously with a CPU 22 system clock and the CPU 22 internal states, and is self-terminating; that is, no dual handshake is required between the memory controller 26 and the host CPU 22 to terminate the cycle.

According to a second type of memory 25 access, hereafter referred to as an asynchronous access, a DMA controller such as the network controller 40 or the printer DMA controller 23 reads or writes to the memory 25 via the buffered bus 36 and the memory bus 30. Such an access occurs, for example, when bitmap data is scanned from the memory 25 to the print fifo 28 by the printer DMA controller 23. This type of access is initiated asynchronously relative to the CPU 22 system clock and CPU 22 internal states, and requires a dual handshake from the memory controller 26 for termination.

According to a third type of bitmap memory access, the memory controller 26 executes a refresh cycle for refreshing the memory 25. Refresh cycles are initiated by the memory controller 26 cyclically in response to an asynchronous timing signal.

Figure 3:
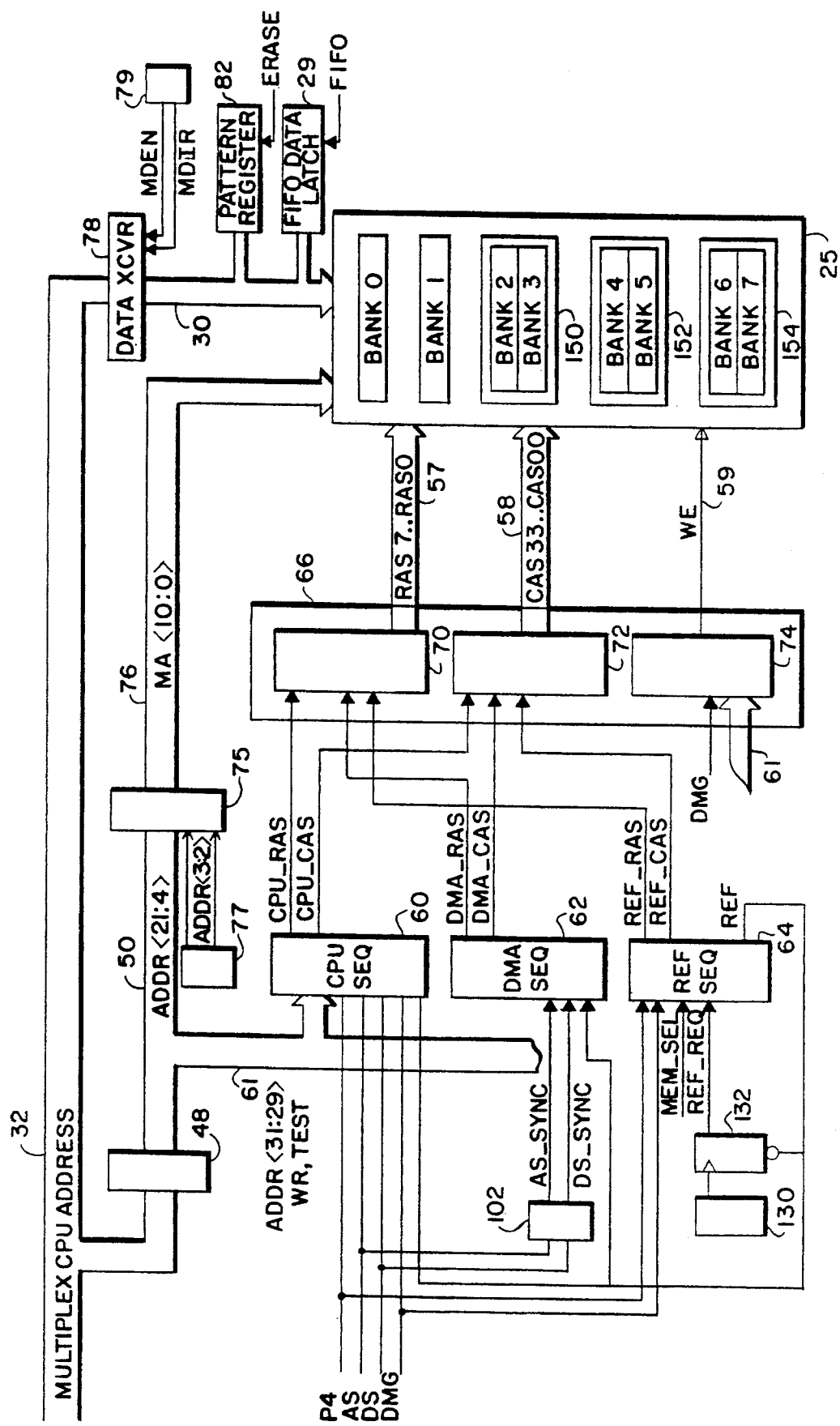
FIG. 3 is a block diagram of the memory subsystem of FIG. 2.

Referring now to FIG. 3, there is shown a more detailed block diagram of the memory controller 26 and the memory 25. The memory 25 comprises dynamic random access memory (DRAM) chips. The memory 25 is controlled in a conventional manner by row address, column address, and write enable strobe signals on lines 57, 58, and 59 respectively.

The memory controller 26 includes a CPU sequencer 60 for controlling synchronous accesses, a DMA sequencer 62 for controlling asynchronous accesses, and a refresh sequencer 64, all of which cooperate to quickly and efficiently arbitrate and execute the three types of memory accesses. All sequencers 60, 62, and 64 operate as synchronous state machines transitioning on a CLKA system clock signal from the host CPU 22. The output of each sequencer 60, 62 and 64 is input to a signal generator 66. The signal generator 66 includes a RAS signal generator 70, a CAS signal generator 72, and a WE signal generator 74, which in turn provide the appropriate row address strobe, column address strobe, and write strobe signals on lines 57, 58, and 59 respectively for controlling the reading and writing of the memory 25.

Data transfers to and from the memory 25 occur via the memory data bus 30. The latched address information on lines 50 are fed to an address multiplexer 75, which in turn provides multiplexed address to the memory 25 on memory address bus 76. A local address generator 77 is provided for generation of the lower order address lines to the multiplexer 75, as will be further described.

Memory data transceivers 78 couple the CPU bus 32 to the memory data bus 30. A transceiver controller 79 provides the signals MDEN and MDIR for controlling the memory data transceivers 78. The memory data transceivers 78 are enabled by the assertion of the signal MDEN, which is coupled to the tristate enable input of the memory data transceivers 78. When the MDEN signal is asserted, data flows between the CPU bus 32 and the memory bus 30. When the MDEN signal is deasserted, the memory bus 30 is tristated such that data cannot flow between the CPU bus 32 and the memory bus 30. The signal MDIR controls the direction of data flow through the memory data transceivers 78. Generally, during a read from the memory 25, the signal MDIR is asserted as a binary '0', directing data from the memory data bus 30 to the CPU bus 32. During a write to the memory 25, the signal MDIR is asserted as a binary '1', directing data from the CPU bus 32 to the memory data bus 30. Scan-erase cycles require special transceiver 78 control, as will be described.

During a scan of the memory 25, a print fifo 28 strobe signal FIFO_STROBE is asserted at the appropriate time to strobe the data on the memory data bus 30 into the fifo data latch 29. A pattern register 82 also resides on the memory data bus 30. During a scan-erase of the memory 25, the strobe signal ERASE strobes pattern register 82 data onto the memory data bus 30. In particular, the pattern register 82 drives a binary '0' on the memory data bus 30, which is then written to the memory 25.

According to the embodiment shown, the host CPU 22 is a VAX® processor. The host cpu 22 generally initiates data transfers according to the timing diagram shown in FIG. 4. A data transfer 84 is broken into bus cycles 86. Each bus cycle 86 consists of four phases, P1, P2, P3, and P4, defining the internal states of the host CPU 22 and differentiated by the host CPU 22 clocks CLKA and CLKB. A bus transfer begins when the host CPU 22 asserts address and status information 87 on the CPU bus 32 during the final phase P4 of a bus cycle. The host CPU 22 then asserts an address strobe signal AS, used to latch the address and status information.

Figure 4:
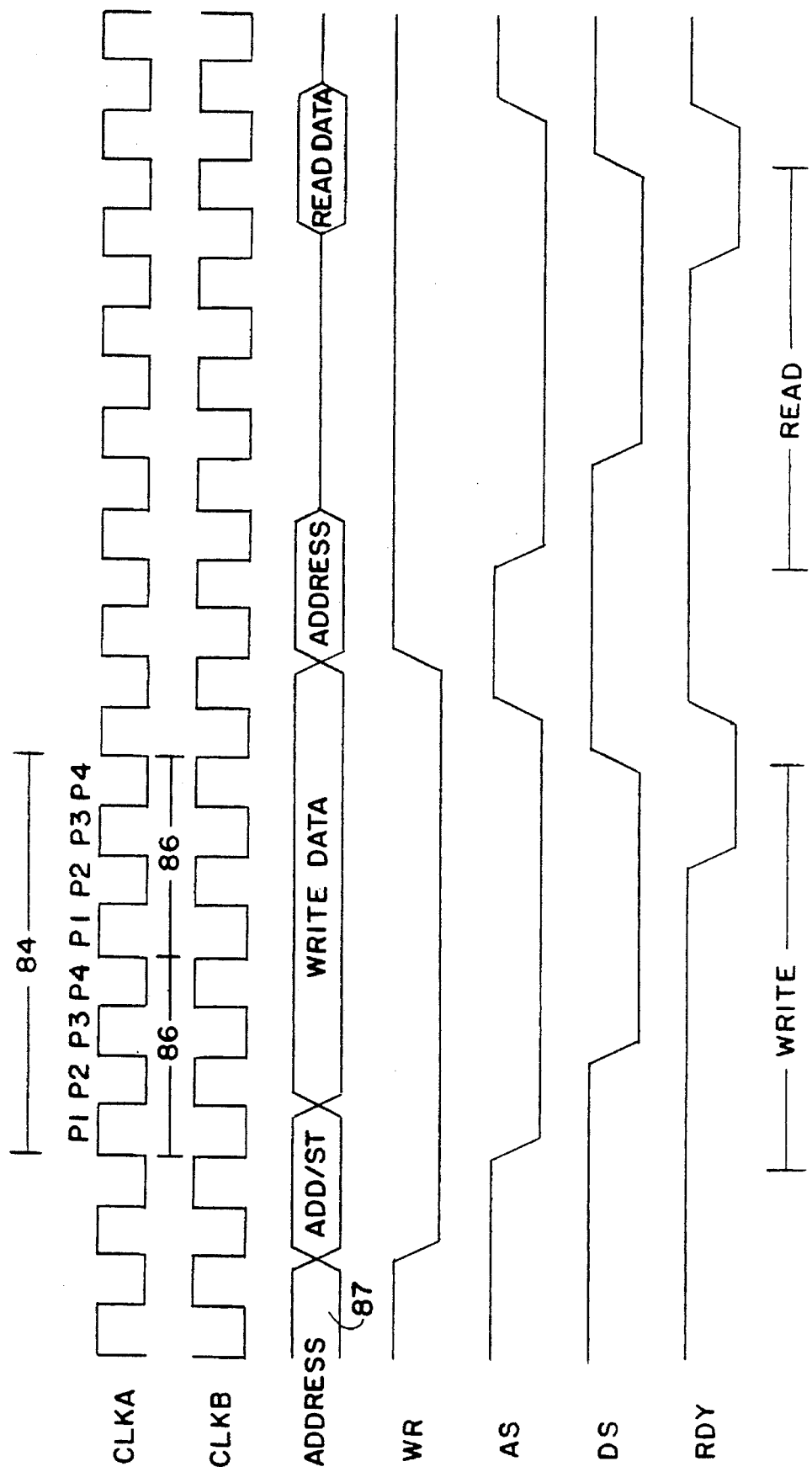
FIG. 4 is a timing diagram showing host CPU bus timing.

If the data transfer is a write, as shown on the left side of FIG. 4, the host CPU 22 asserts the data to be written on the CPU bus 32 during the P2 phase immediately following the P1 phase in which AS was asserted. The host CPU 22 then asserts a data strobe signal DS on the P3 phase. The data strobe signal DS signals to the device being written that the bus contains valid data.

If the data transfer is a read, as shown on the right side of FIG. 4, the host CPU 22 deasserts the address and status information 87 on the CPU bus 32 during the P2 phase immediately following the P1 phase in which AS was asserted. The host CPU 22 then asserts a data strobe signal DS on the P3 phase. The data strobe signal DS signals to the device being read that the CPU bus 32 is ready to be driven with data.

The host CPU 22 then awaits the assertion of the signal RDY during any of the following P3 phases. When RDY L is asserted, the CPU 22 terminates the data transfer. The data strobe signal DS is deasserted on the following P1 phase, and the address strobe signal AS is deasserted on the following P2 phase. A new data transfer may begin on the following P4 phase.

Figure 6:
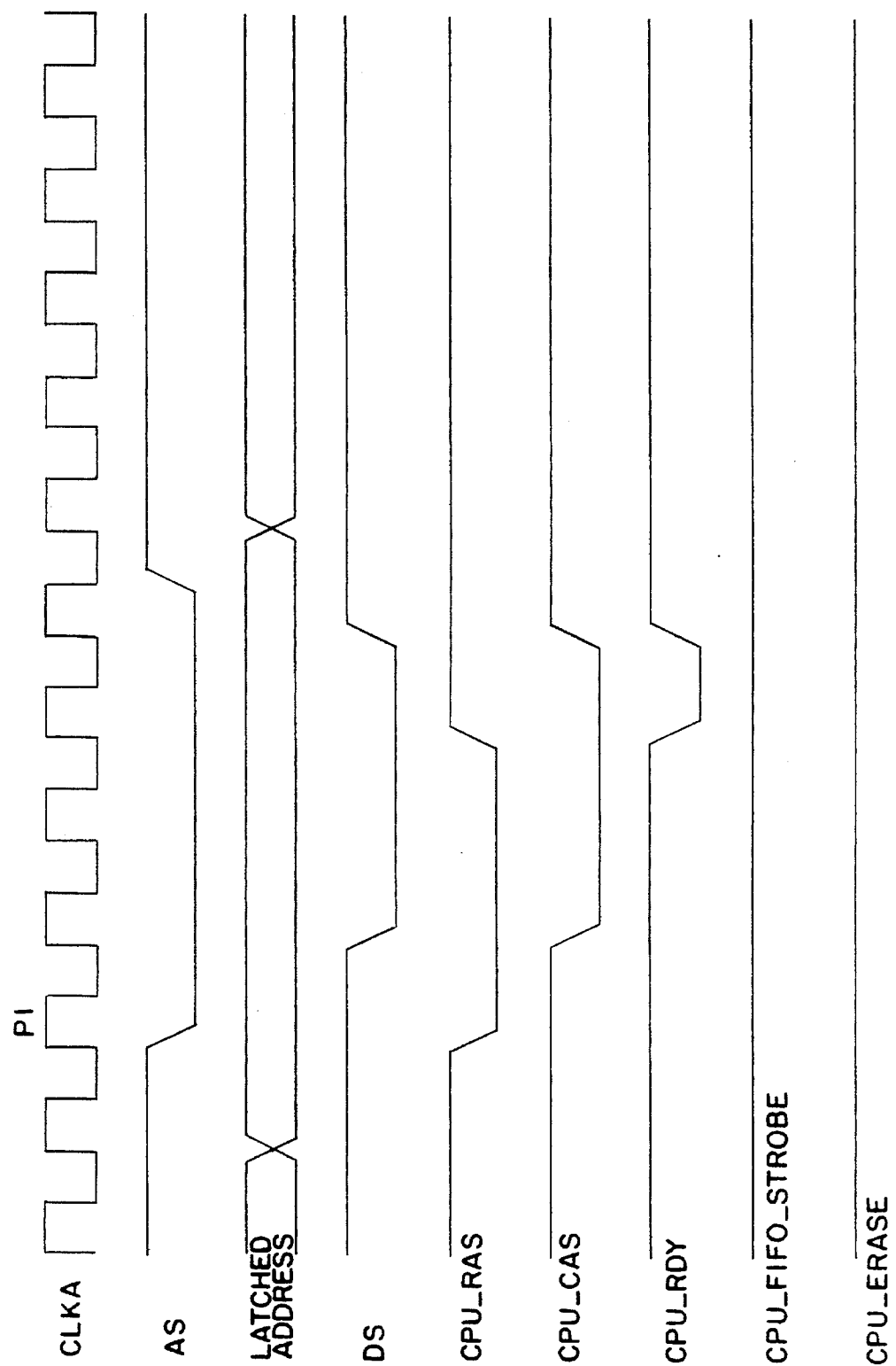
FIG. 6 is a timing diagram of a longword host CPU read from memory.
Figure 7:
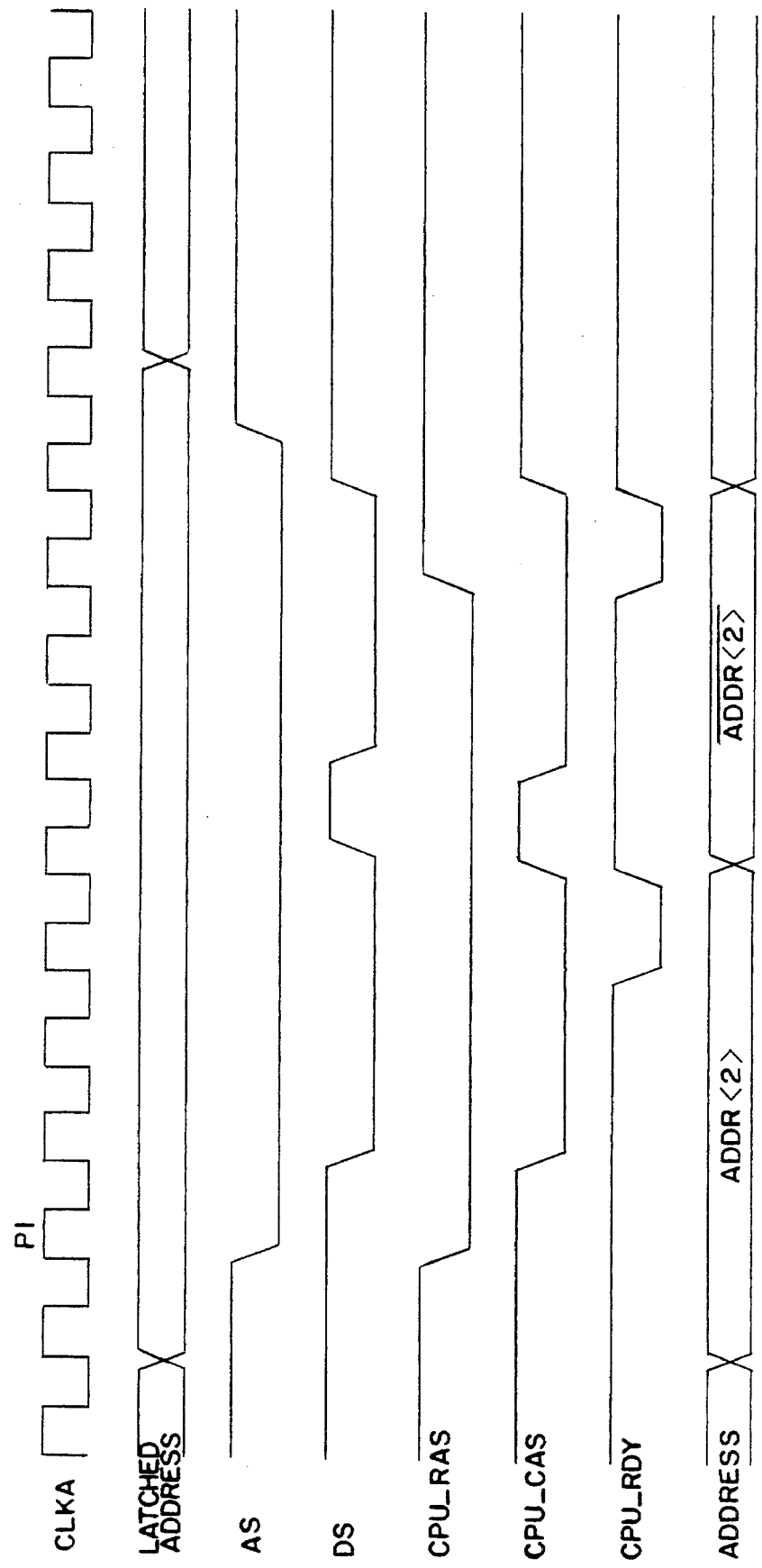
FIG. 7 is a timing diagram of a quadword host CPU read from memory.

The host CPU 22 can initiate any of the following data transfer types: CPU longword (32 bit) read, CPU longword write, CPU quadword read, CPU scan-mode read (CPU scan), and CPU scan-mode read-erase (CPU scan-erase). A quadword read includes two separate assertions of the data strobe signal DS, as shown in FIG. 6. The CPU scan and CPU scan-erase transfers are reserved for diagnostic use.

Host CPU 22 initiated scan and scan-erase transfers are used to test the scanning of data from the memory 25 to the print fifo 28. During a scan, data is read from a location in the memory 25 into the print fifo 28 and the CPU 22. During a scan-erase, data is first read from a location in the memory 25 into the print fifo 28 and CPU 22, and then the memory location is "erased"; that is, the memory location is written to binary '0'. The pattern register 82 drives the memory data bus 30 to binary '0' during the write portion of a scan-erase transfer.

A host CPU scan appears on the bus as a read, so the memory data transceivers 78 are enabled and will direct data from the memory data bus 30 to the CPU bus 32. A host CPU scan-erase, however, appears on the bus as a write, with the host CPU 22 driving data on the CPU bus 32. The memory data transceivers 78 must therefore be disabled during this type of transfer in order to avoid the bus contention that would occur during the read portion of the scan-erase transfer.

The CPU sequencer 60 provides timing signals in response to memory 25 accesses initiated by the host CPU 22. The CPU sequencer 60 is implemented as a state machine which transitions on the host CPU 22 clock signal CLKA. The timing signals are used by the signal generator 66 for providing the DRAM row address strobe, column address strobe, and write strobe control signals on lines 57, 58, and 59 respectively.

Figure 5:
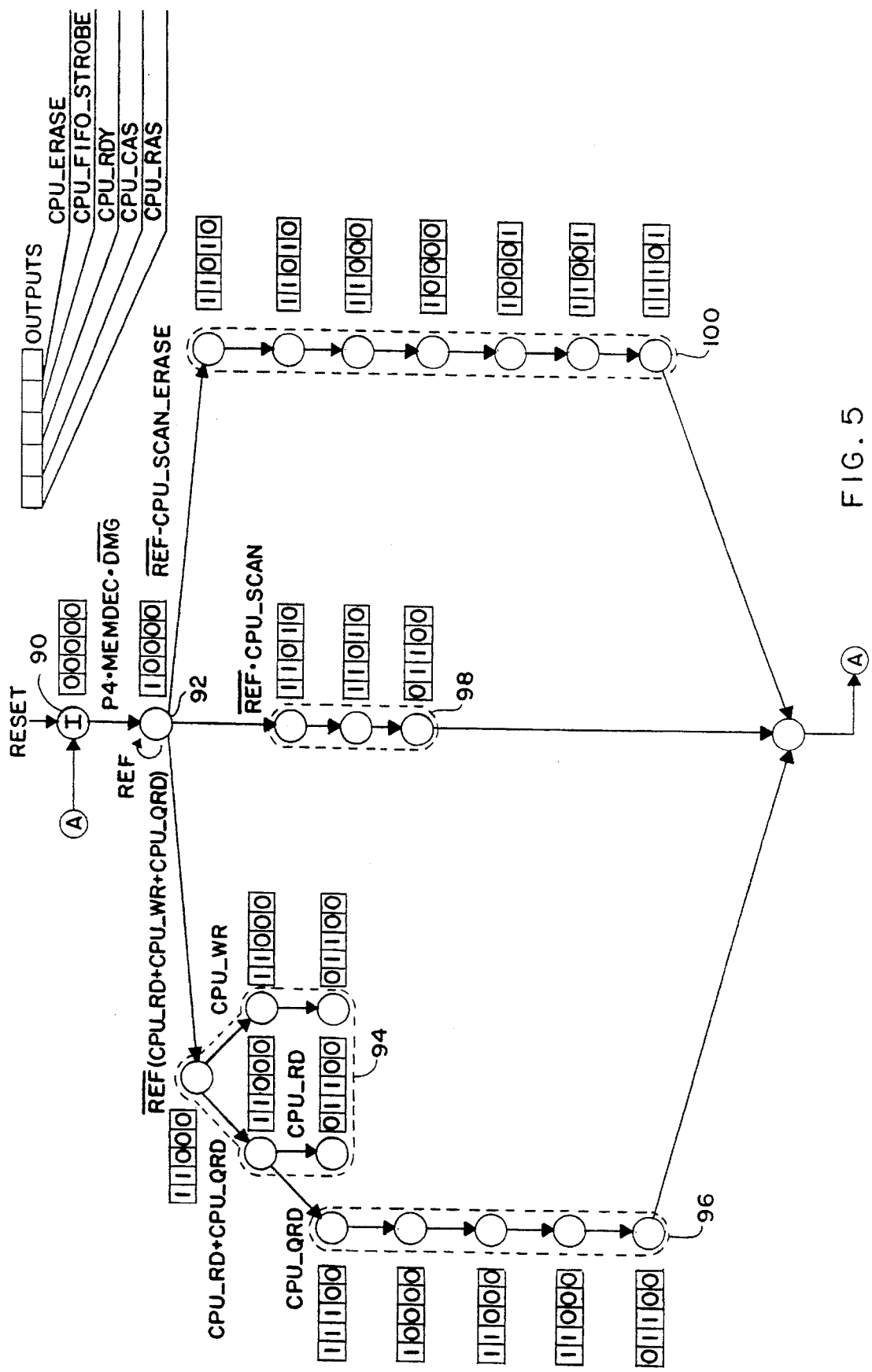
FIG. 5 is a state diagram of a CPU sequencer according to the principles of the invention.

FIG. 5 shows a state diagram of the operation of the CPU sequencer 60. The CPU sequencer 60 is fed the following input control signals: P4, the assertion of which indicates the CPU internal state; DMG, the assertion of which indicates that the present data transfer was initiated by the printer DMA controller 23 rather than the host CPU 22; and REF, the assertion of which indicates that a refresh cycle is in progress. The CPU sequencer 60 is also fed latched address and status information, a write status signal WR, and a TEST status signal on lines 61. The TEST status signal is asserted for diagnostic scan and scan-erase transfers. The sequencer 60 decodes these input signals to provide the following signals:

MEMDEC: asserted when AS is asserted and latched address indicates memory 25 is being accessed;

CPU_RD: asserted for/DMG,/REF,/TEST,/WR, and latched address indicates that the present data transfer is a longword access to memory 25;

CPU_WR: asserted for/DMG,/REF,/TEST, WR, and latched address indicates that the present data transfer is a longword access to memory 25;

CPU_QRD: asserted for/DMG,/REF,/TEST,/WR, and latched address indicates that the present data transfer is a quadword access to memory 25;

CPU_SCAN: asserted for/DMG,/REF, TEST,/WR, and latched address indicates that the present data transfer is a diagnostic scan of the memory 25; and CPU_SCAN_ERASE: asserted for/DMG,/REF, TEST, WR, and latched address indicates that the present data transfer is a diagnostic scan-erase of the memory 25.

The CPU sequencer 60 provides as output the signals CPU_RAS, CPU_CAS, CPU_RDY, CPU_FIFO_STROBE, and CPU_ERASE. The CPU_RAS and CPU_CAS signals are fed to the signal generator 66 to provide the timing for the respective row address and column address strobe signals on lines 57 and 58 to the memory 25 for host CPU 22 initiated cycles. The assertion of the CPU_RDY signal terminates the CPU data transfer. The assertion of the CPU_FIFO_STROBE signal strobes data into the fifo data latch 29. The assertion of the CPU_ERASE signal provides the timing for the assertion of the WE$_x$ signals on lines 59 to the memory 25 in order to clear the memory during a CPU scan-erase transfer. In FIG. 6, there is shown a block of boxes next to each state. A binary '1' in any box indicates the assertion of the output associated with that box as indicated in the upper right corner. Deasserted inputs are indicated by a superscript bar.

The CPU sequencer 60 begins upon the assertion of a reset signal at idle state 90. The sequencer waits until phase four of a bus cycle of a host CPU 22 initiated memory 25 data transfer, as indicated by the simultaneous assertion of the signals P4 and MEMDEC, and the deassertion of DMA. It then proceeds to state 92 and asserts the CPU_RAS output signal. CPU_RAS is asserted prior to the assertion of the address strobe signal AS L by the host CPU 22 in order to guarantee that row address strobe access time from the memory 25 will be met. From state 92, the sequencer 60 branches depending on the type of data transfer being executed, as indicated by the inputs REF, CPU_RD, CPU_WR, CPU_QRD, CPU_SCAN, and CPU_SCAN_ERASE. If the input REF is asserted, the sequencer remains in state 92, asserting CPU_RAS until the end of the refresh cycle. If REF is deasserted and the transfer is a longword read or longword write, the sequencer proceeds through the section of the state machine within dotted lines 94. If REF is deasserted and the transfer is a quadword read, the sequencer proceeds through the section of the state machine within dotted lines 96. If REF is deasserted and the transfer is a diagnostic scan, the sequencer proceeds through the section of the state machine within dotted lines 98. If REF is deasserted and the transfer is a diagnostic scan-erase, the sequencer proceeds through the section of the state machine within dotted lines 100. Each branch terminates at state 101, which proceeds back to the idle state 90.

The state diagram of CPU sequencer 60 is shown for convenience and ease of understanding as having separate paths for each type of data transfer. One skilled in the art will realize that the states can be combined and reduced, and the outputs derived as a combination of states and inputs.

In FIGS. 6, 7, 8, and 9 there are shown timing diagrams corresponding to each of the sections 94, 96, 98, and 100 respectively of the state diagram of FIG. 5. The output signals CPU_RAS and CPU_CAS for CPU longword read and longword write transfers provide conventional DRAM row address strobe and column address strobe timing, as seen in timing diagrams 94 and 96. The CPU quadword read transfer consists of two adjacent longword reads from the memory 25. A DRAM page mode cycle is executed to complete the quadword transfer; that is, the CPU_RAS signal remains asserted while the CPU_CAS signal is twice asserted. The local address generator 77 (FIG. 2) inverts the address bit A2 between the longword accesses of a CPU quadword read transfer.

Figure 8:
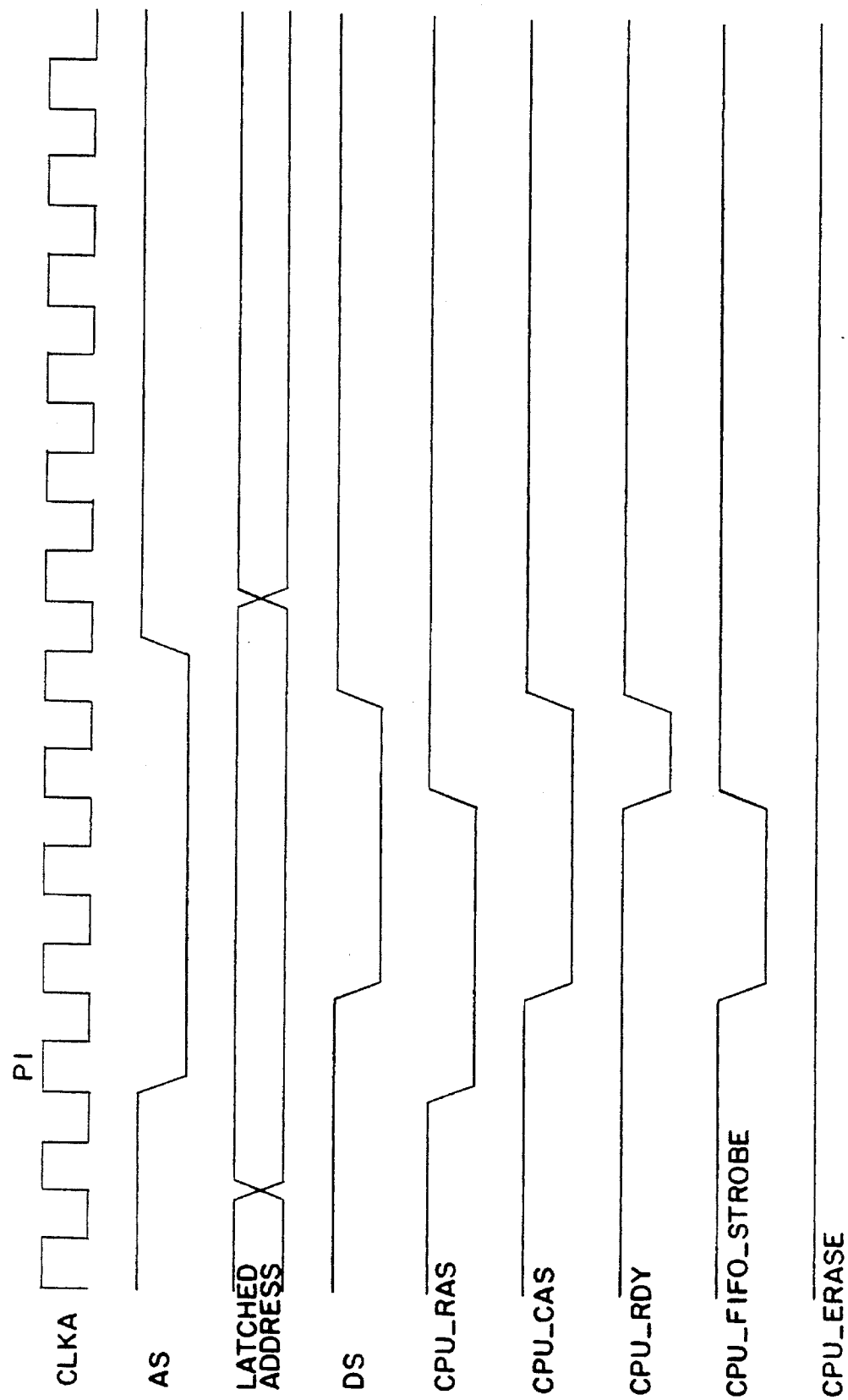
FIG. 8 is a timing diagram of a host CPU diagnostic scan.

During a CPU scan, as seen in the timing diagram of FIG. 8, the CPU_FIFO_STROBE output is asserted at the end of the transfer to strobe the data on the memory data bus 30 into the fifo data latch 29.

During a CPU scan-erase transfer, the host CPU 22 initiates a data write transfer to a location in the memory 5. Data is first read from the location in memory 25 and strobed into the fifo data latch 29. The location in memory is then erased, or written to a binary '0'. According to an aspect of the invention, the reading of the data into the fifo data latch 29 and the subsequent clearing of the memory location is completed within a single CPU data write transfer by executing a page-mode read of the memory location followed by a page-mode write of the data in the pattern register 82 to the same memory 25 location.

Figure 9:
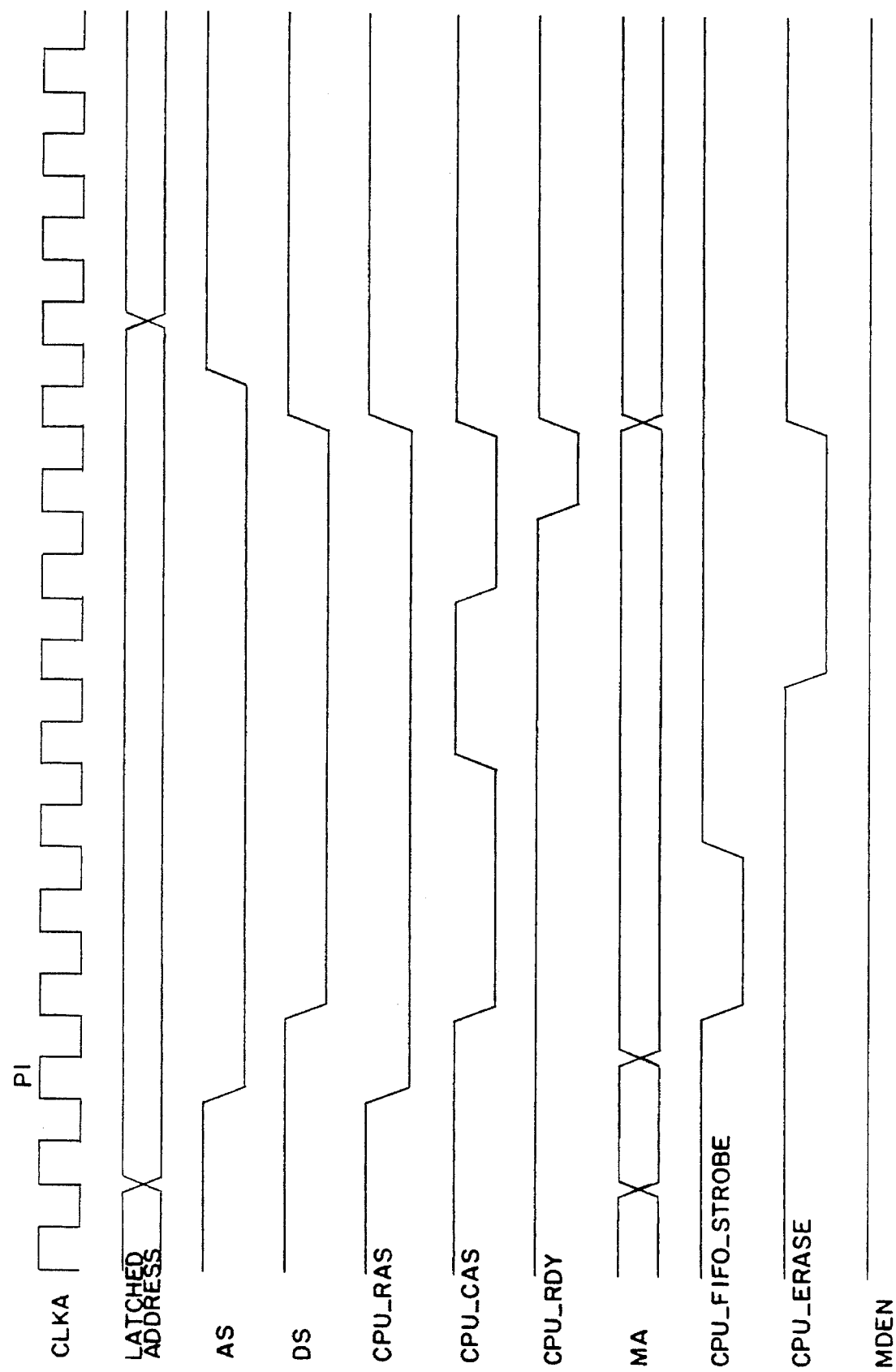
FIG. 9 is a timing diagram of a host CPU diagnostic scan-erase according to the principles of the invention.

As shown in dotted section 100 of the state diagram of FIG. 5, and in the timing diagram of FIG. 9, the scan-erase transfer begins with the assertion of output signals CPU_RAS and CPU_CAS to initiate a memory read from a given address onto the memory data bus 30. The assertion of the output CPU_FIFO_STROBE strobes the data on the memory data bus 30 into the fifo data latch 29. The output signal CPU_CAS is then deasserted, while CPU_RAS remains asserted. The output signal CAS is then reasserted to initiate a page mode read, and CPU_ERASE is asserted. The memory address has not changed. The CPU_ERASE output is coupled to the appropriate write strobe inputs on the memory 25 DRAMS, and serves to strobe data stored in the pattern register 82 onto the memory bus 30. Thus, the data driven by the pattern register 82 on the memory data bus 30 is written back to the location just read.

The scan-erase transfer is initiated by the host CPU 22 as a single write transfer. However, according to this aspect of the invention, the CPU sequencer completes a read transfer from the memory 25 to the print fifo 28, followed by a write transfer from the pattern register 82 to the memory 25, all within the single CPU write transfer. Care must therefore be taken to ensure the absence of bus contention.

During the scan-erase transfer, the transceiver controller 79 deasserts the MDEN signal to disable the memory data transceivers 78; thus, there is no contention between the data being driven on the CPU bus 32 by the host CPU 22 and the data being driven on the memory bus 30 during the memory read portion of the scan-erase transfer, or the data being driven by the pattern register 82 during the memory write portion of the scan-erase transfer.

Referring back to FIGS. 2 and 3, during operation, DMA controllers 38 residing on the buffered system bus 36 initiate asynchronous memory 25 accesses. The printer DMA controller 23 is responsible for executing scan and scan_erase transfers in response to the fill request signal from the printer/video interface 27 in order to transfer bitmap data from the memory 25 to the print fifo 28. The network controller 40 is responsible for transferring data from the computer 12 to the print system 10. The DMA sequencer 62 provides timing signals in response to asynchronous memory 25 accesses initiated by the printer DMA controller 23 and the network controller 40. The timing signals are used by the signal generator 77 in generating the row address, column address, and write strobes on lines 57, 58, and 59 respectively.

In order to initiate a data transfer, a DMA controller 38 takes control of the CPU bus 32 from the host CPU 22, including the bus control signals AS and DS. Thus, CPU 22 initiated transfers and DMA controller 38 initiated transfers occur in a mutually exclusive manner relative to the CPU bus 32. A DMA controller 38 can initiate asynchronous transfers of variable word lengths, including transfers of the following types: DMA longword read, DMA longword write, DMA octaword read, DMA octaword write, DMA scan, and DMA scan-erase. Single longword and octaword DMA read and write transfers are typically initiated by the network controller 40, while DMA scan and scan-erase transfers are always initiated by the printer DMA controller 23.

Figure 10:
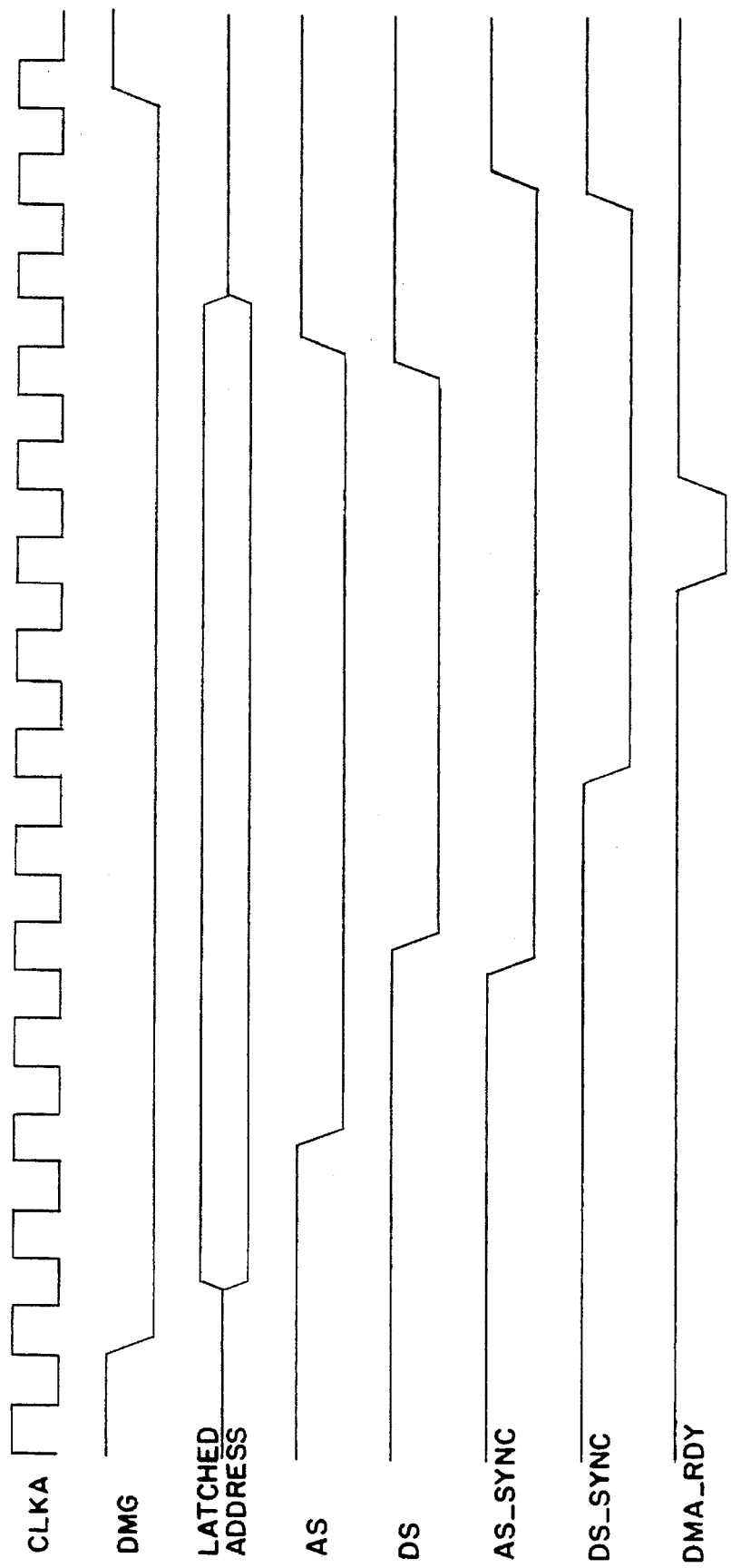
FIG. 10 is a timing diagram of DMA cycle timing as initiated by a bus controller.

Generally, in order to initiate a DMA transfer to the memory 25, The system bus controller 34 is enabled to couple the system bus 36 to the CPU bus 32. The memory access then follows a handshaking protocol. Referring to FIG. 10, the DMA controller 38 asserts address and status information on the system bus 36, and then asserts the address strobe signal AS, followed by the data strobe signal DS. The assertions of the signals AS and DS, however, are asynchronous to the CPU clock CLKA. The signals AS and DS must therefore be re-synchronized to the CPU clock CLKA by the DMA sequencer 62. A dual rank synchronizer 102 (FIG. 3) accepts as input the signals AS and DS, and provides as output re-synchronized strobe signals AS_SYNC and DS_SYNC for use by the DMA sequencer 62. In response to the assertion of the re-synchronized AS_SYNC signal, the DMA sequencer 62 accesses memory and then notifies the DMA controller 38 that it has completed the access. The DMA controller 38 acknowledges the DMA sequencer by deasserting the data strobe signal DS L. For a single longword DMA read, DMA write, or DMA scan or scan-erase transfer, the printer DMA controller 23 then deasserts the address strobe signal AS, indicating the end of the transfer.

If the data transfer consists of multiple memory accesses, such as a DMA octaword read or write, the address strobe signal AS remains asserted, the bus controller reasserts the data strobe signal DS, and the handshake is repeated. The DMA controller 38 concludes the transfer with the deassertion of the data strobe signal DS followed by the deassertion of the address strobe signal AS.

Figure 11:
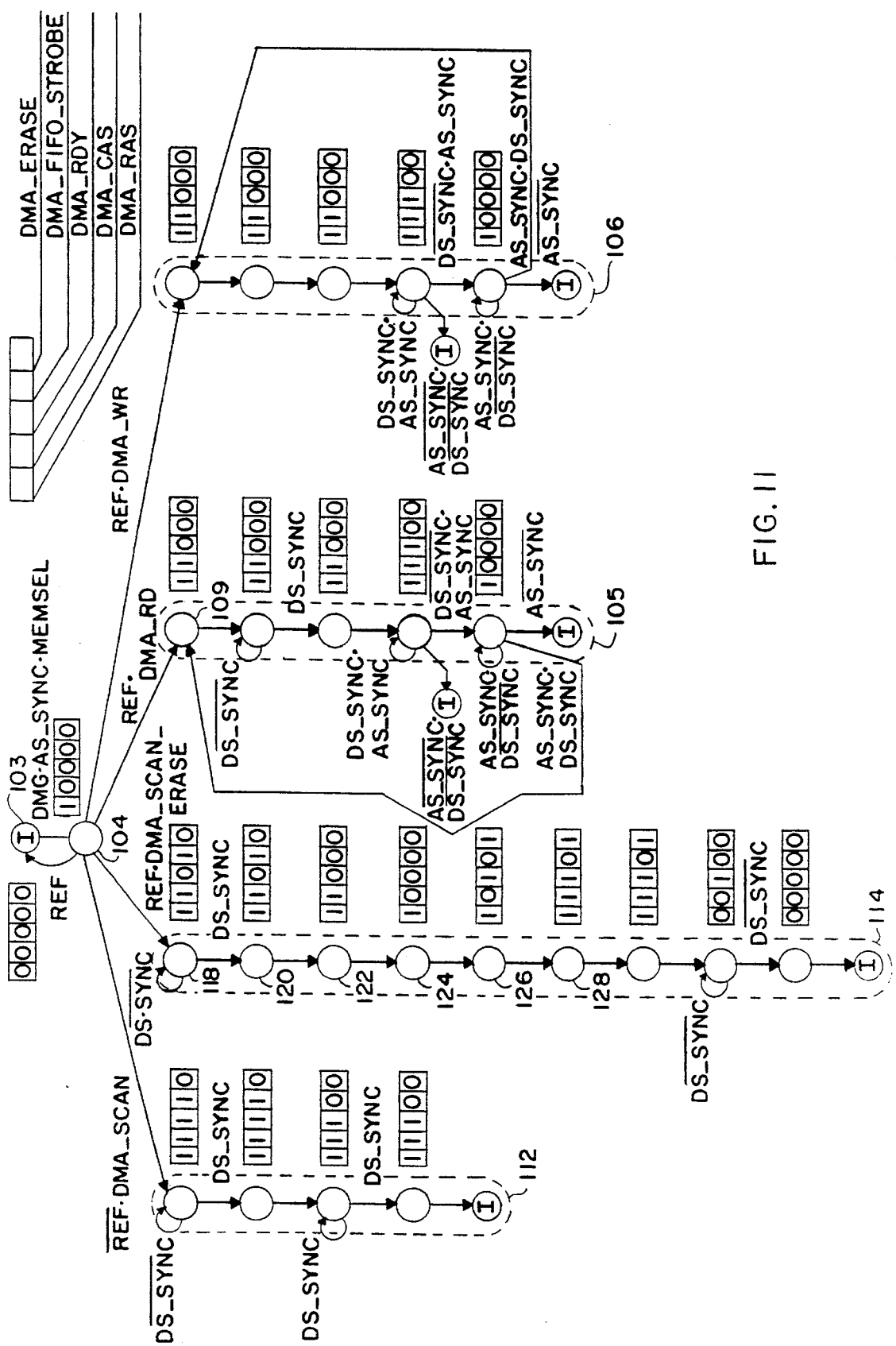
FIG. 11 is a block diagram of a DMA sequencer according to the principles of the invention.

Referring now to FIG. 11, there is shown a state diagram of the operation of the DMA sequencer 62. The sequencer 62 is fed the following inputs: DMG, which when asserted indicates that a DMA controller 38, either the network controller 40 or the printer DMA controller 23, has control of the bus; AS_SYNC, the re-synchronized version of the address strobe signal AS driven by a DMA controller 38; DS SYNC, the re-synchronized version of the address strobe signal DS driven by a DMA controller 38; REF, which when asserted indicates a refresh cycle is in progress; and UDC, which when asserted indicates that the printer DMA controller 23 is active. The DMA sequencer 62 is also fed the latched address and a write status signal WR on lines 61. The inputs are decoded to provide the following signals:

DMA_RD, asserted for DMG,/UDC,/WR, and latched address indicates a transfer from memory 25;

DMA_WR, asserted for DMG, /UDC, WR, and latched address indicates a transfer to memory 25;

DMA_SCAN, asserted for DMG, UDC,/WR, and latched address indicates a transfer to memory 25;

DMA_SCAN-ERASE, asserted for DMG, UDC, /WR, and latched address indicates a transfer to memory 25;

The DMA sequencer 62 provides as outputs the following signals: DMA_RAS, DMA_CAS, DMA_RDY, DMA_FIFO_STROBE, and DMA_ERASE. The DMA_RAS and DMA_CAS signals provide the timing for the respective row address and column address strobe signals to the memory 25 on lines 57 and 58 for transfers initiated by the printer DMA controller 23. The DMA_RDY signal is a handshake signal returned to the printer DMA controller 23 in response to the assertion of the DS signal and upon completion of a transfer. The assertion of the DMA_FIFO_STROBE signal strobes data into the fifo data latch 29. The assertion of the DMA_ERASE signal provides the timing for the assertion of the write strobe signals on lines 59 to the memory 25 in order to clear the memory during a DMA scan-erase transfer, and provides the timing for the strobing of data onto the memory data bus 30 from the pattern register 82. In FIG. 11, there is shown a block of boxes next to each state. A binary '1' in any box indicates the assertion of the output associated with that box as indicated in the upper right corner. Deasserted inputs are indicated by a superscript bar.

Upon the assertion of a system reset signal, the DMA sequencer 62 enters an idle state 103 until it detects a DMA access to the memory 25, as indicated by the simultaneous assertion of the inputs DMG, AS_SYNC, and MEMDEC. The DMA sequencer 62 then transitions to state 104 and asserts the output DMA_RAS. The sequencer 62 then checks to see if a refresh cycle is in progress, as indicated by the state of the input signal REF. If REF is deasserted, the sequencer 62 branches to a particular sequence depending upon the type of DMA transfer in progress.

Figure 12A:
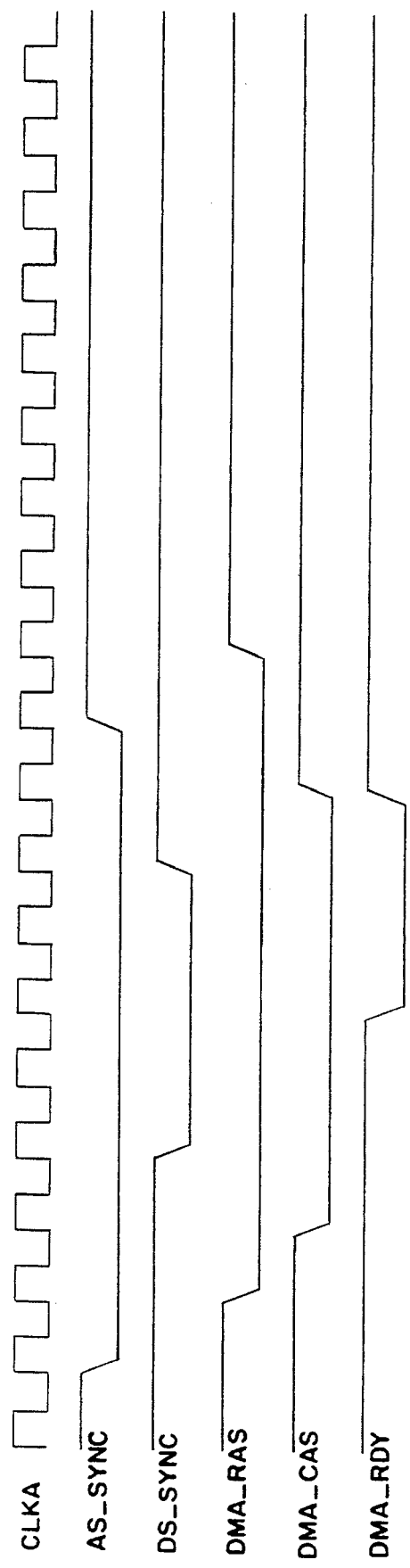
FIG. 12 (a) is a timing diagram of a single longword DMA access.
Figure 12B:
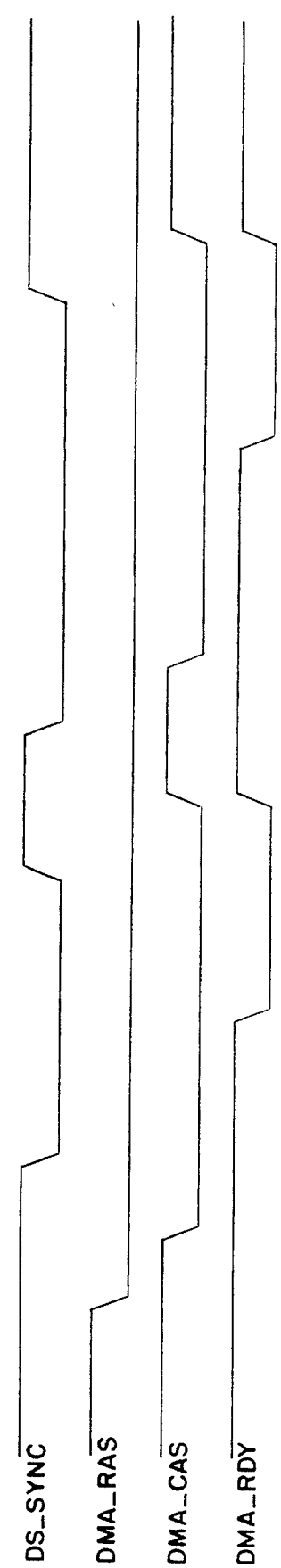

If the DMA transfer is a DMA read or a DMA octaword read, the sequencer 62 branches to the dotted section 105. In FIGS. 12(a) and 12(b) there are shown timing diagrams representing longword DMA read sequences. In general, the DMA sequencer 62 asserts the output DMA_CAS, waits for the assertion of the data strobe signal DS_SYNC, asserts the DMA_RDY output signal, and then waits for the deassertion of DS_SYNC. After DS_SYNC is deasserted, the sequencer 62 monitors AS_SYNC and DS_SYNC.

If the DMA transfer is a longword DMA read, as shown in FIG. 12 (a), AS_SYNC is deasserted and the sequencer 62 returns to the idle state to await the start of another DMA transfer.

If the DMA transfer is a multiple word read, as shown in FIG. 12(b), DS_SYNC is reasserted. The sequencer 62 then transitions back to the state 109 and re-asserts DMA_CAS. Page mode cycles continue until the deassertion of AS_SYNC. When AS_SYNC is deasserted, the sequencer 62 transitions back to the idle state 103.

If the DMA transfer is a write or octaword write, the sequencer 62 proceeds from state 102 through the dotted section 106. The memory timing signals DMA_RAS and DMA_CAS provide timing equivalent to that for read transfers.

Referring back to FIGS. 3 and 4, during a DMA read or octaword read, the transceiver controller 79 drives the MDEN and MDIR control lines to the memory data transceivers 78 to enable and direct data from the memory bus 30 to the CPU bus 32, while the bus controller 34 enables and directs data from the cpu bus 32 onto the buffered system bus 36 where it can then be read by the DMA controller 38. During a DMA write or octaword write, the memory data transceivers 78 are similarly enabled by the transceiver controller 79 but directed from the buffered system bus 36 to the CPU bus 32 and then to the memory bus 30.

Figure 13:
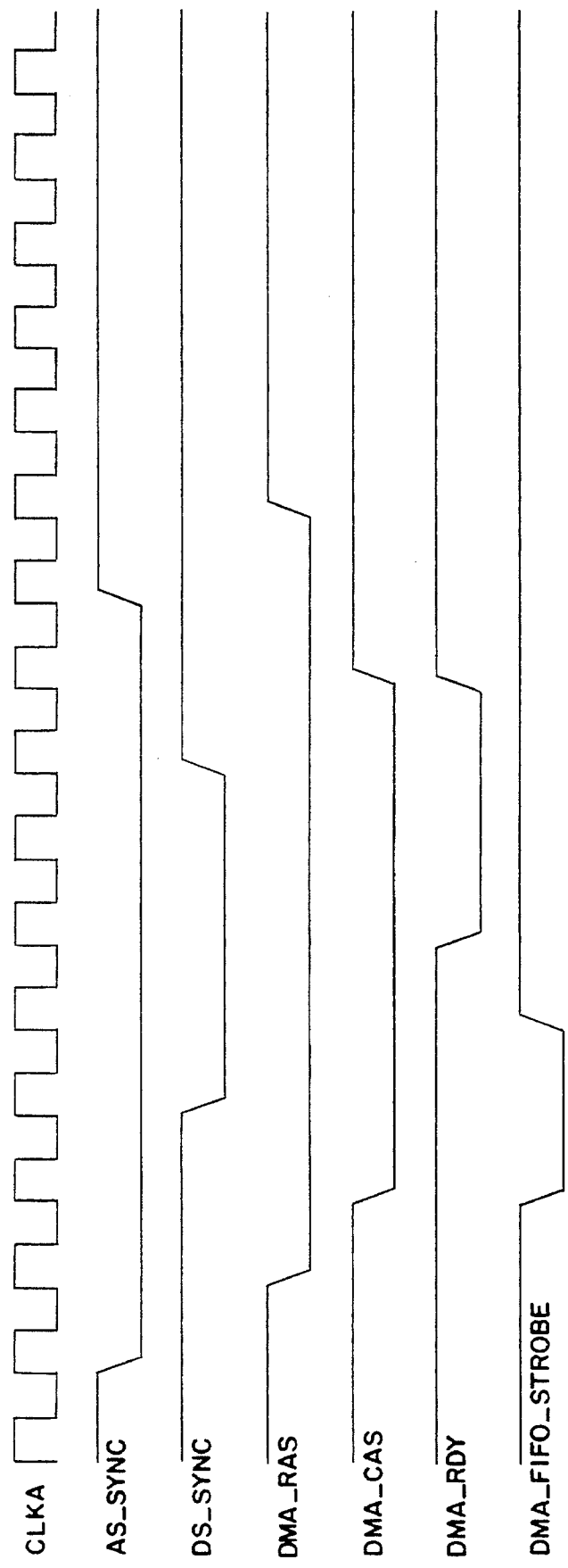
FIG. 13 is a timing diagram of a DMA scan.
Figure 14:
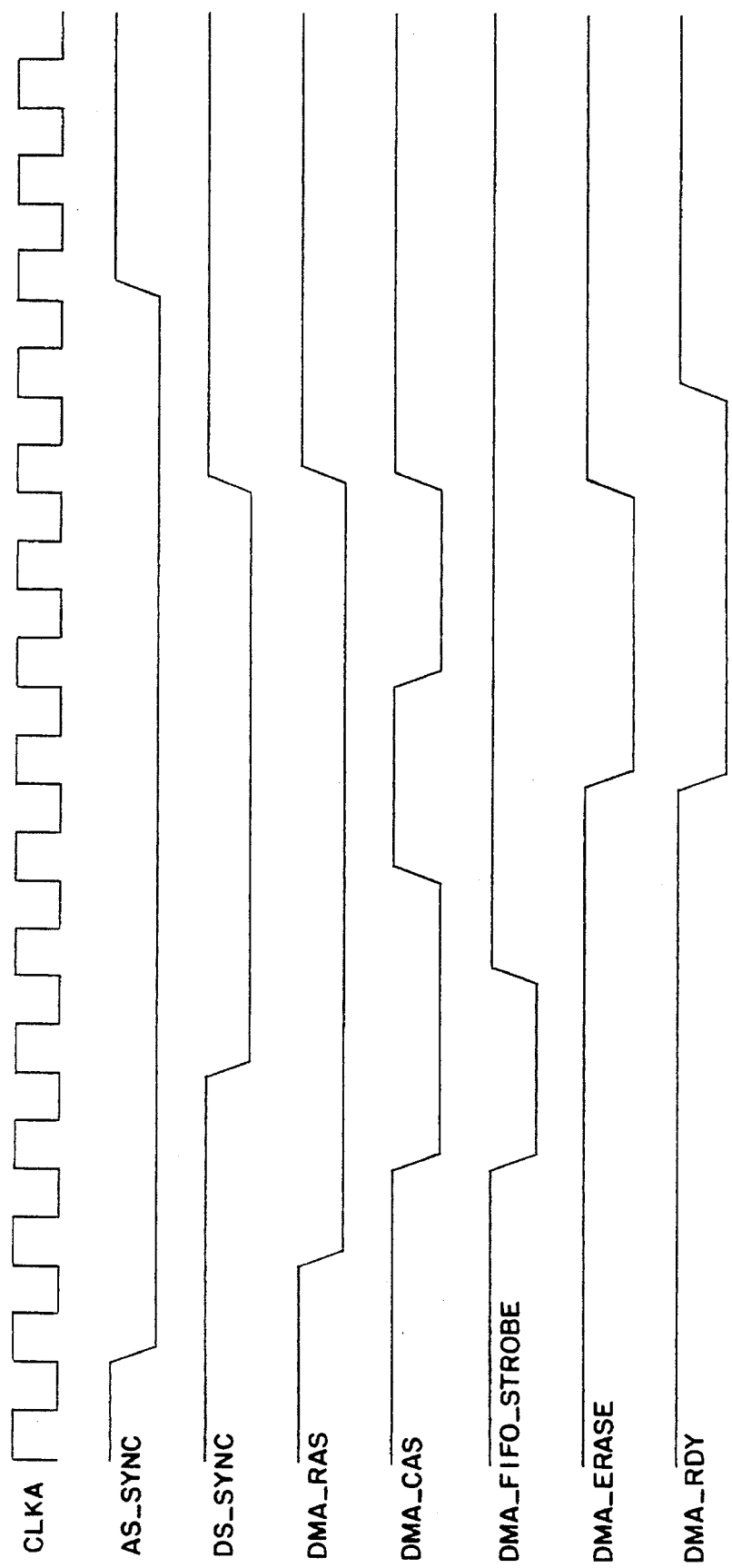
FIG. 14 is a timing diagram of a DMA scan-erase according to the principles of the invention.

The DMA scan transfer, shown in dotted area 112 and in the timing diagram of FIG. 13, is used during operation to transfer data from the memory 25 to the print fifo 28. The DMA scan transfer is similar to the DMA read transfer except that the output DMA_FIFO_STROBE is asserted to latch the data read from the memory 25 into the print fifo 28. It is not necessary to enable the memory data transceivers 78 or the system bus controller 34 for this access, since the data need only pass over the memory bus 30 to the print fifo data latch 29. However, enabling data onto the CPU bus 32 and the buffered system bus 36 during the scan may be advantageous for data checking purposes.

The DMA scan-erase transfer, shown in dotted area 114 and timing diagram 14, is used during operation to transfer data from the memory bitmap 26 to the print fifo 28 and then to clear the memory 25 location just read. Data is first read from the location in memory 25 and strobed into the fifo data latch 29. The location in memory is then erased, or written to a binary '0'. According to an aspect of the invention, the reading of the data into the fifo data latch 29 and the subsequent clearing of the memory location is completed within a single DMA data write transfer by executing a page-mode read of the memory location followed by a page-mode write of the data in the pattern register 82 to the same memory 25 location.

The scan-erase transfer is decoded as a write transfer initiated by the printer DMA controller 23. It begins with a memory 25 read and a simultaneous print fifo data latch 29 write. DMA_RAS and DMA_CAS are asserted in states 118, 120, and 122 to read data from a given location in the memory 25 onto the memory data bus 30. During the assertion of the output signal DMA_CAS, the signal DMA_FIFO_STROBE is asserted in state 118 and deasserted in state 120. The rising edge of the DMA_FIFO_STROBE signal latches the data on the memory bus 30 into the fifo data latch 29. The memory read is completed upon the deassertion of the signal DMA_CAS in state 124. In state 26, the signal DMA_ERASE is asserted. This signal provides the timing for the appropriate write strobe signals on lines 59 to the DRAMs during DMA scan-erase transfers, and is used to enable the pattern register 82 to drive data, normally a binary '0', onto the memory bus 30 The DMA_RDY handshake signal is asserted to indicate to the printer DMA controller 23 that the transfer has been completed. In state 128, DMA_CAS is reasserted, causing the data on the memory data bus 30 to be written to the memory 25. The sequencer 62 then deasserts all outputs and waits for the deassertion of the data strobe signal DS_SYNC, upon which it returns to the idle state 103.

Since the DMA scan-erase transfer is initiated as a DMA write, care must be taken to ensure the absence of bus contention. During the DMA scan-erase transfer, the memory data transceivers 78 are disabled; thus, there is no contention between the data being driven on the buffered system bus 36 and the CPU bus 32 by the printer DMA controller 23, and the data being driven on the memory bus 30 during the memory read portion of the DMA scan-erase transfer, or the data being driven by the pattern register 82 during the memory write portion of the scan-erase transfer.

Referring back to FIGS. 2 and 3, the refresh sequencer 64 controls the refreshing of the bitmap memory 62. A refresh timer 130 pulses a refresh request signal on line 131 approximately every 53 microseconds. A refresh request latch 132 latches the timer pulse and outputs a refresh request signal REF_REQ to the refresh sequencer 64. The refresh request signal REF_REQ is asynchronous to the system clock CLKA and the CPU 22 internal states.

Figure 15:
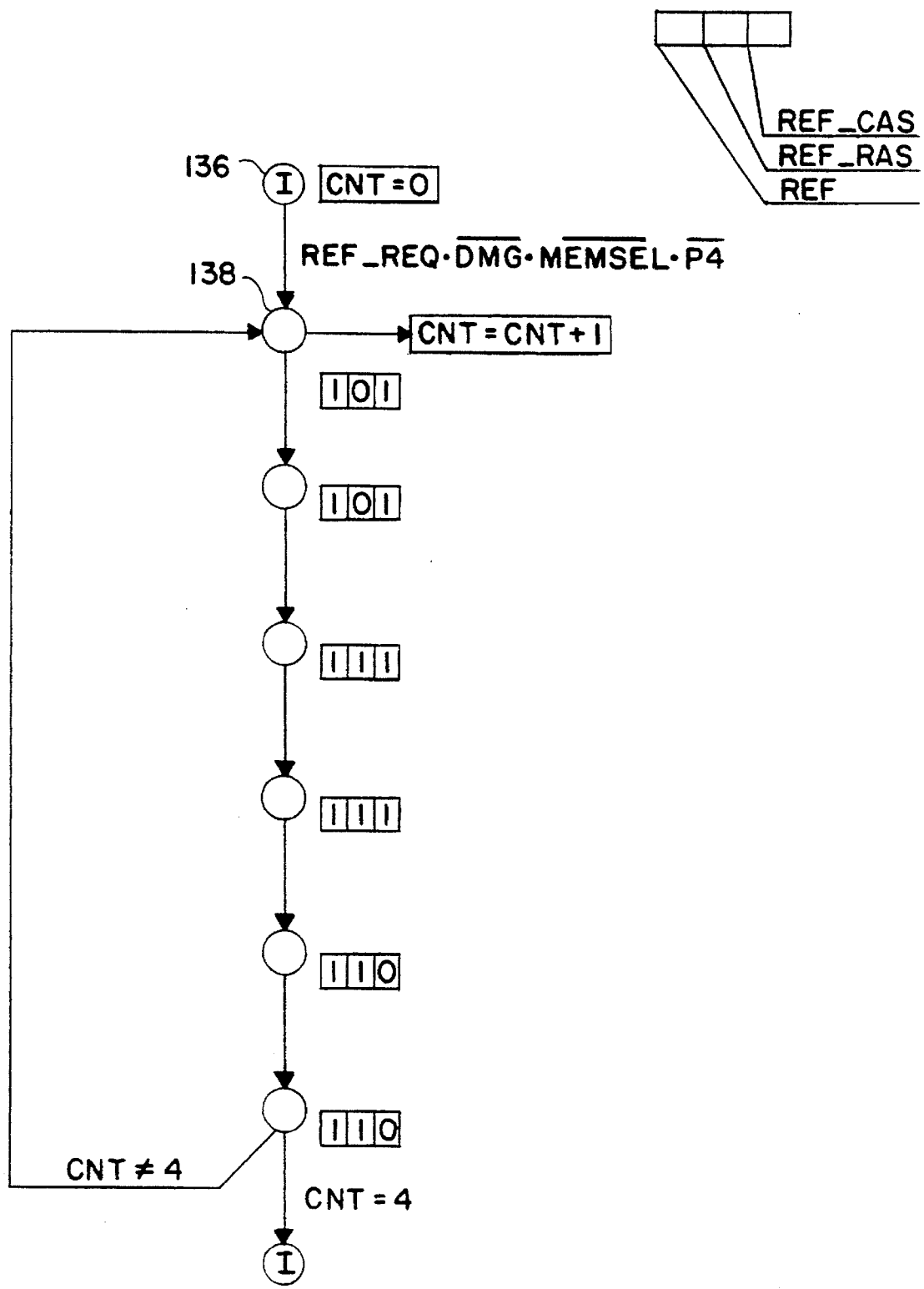
FIG. 15 is a block diagram of a refresh sequencer according to the principles of the invention.
Figure 16:
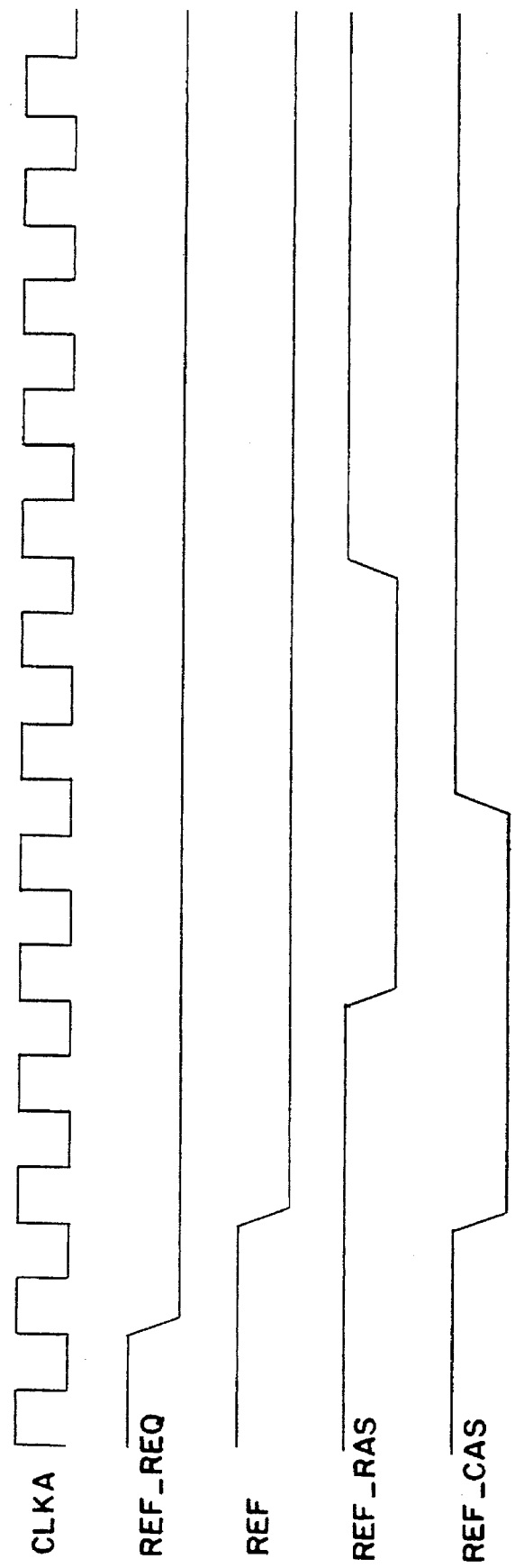
FIG. 16 is a timing diagram of refresh timing.

Referring now to FIG. 15 there is shown a state diagram of the operation of the refresh sequencer 64, with a block of boxes next to each state. A binary '1' in any box indicates the assertion of the output associated with that box as indicated in the upper right corner. Deasserted inputs are indicated by a superscript bar. In FIG. 16 there is shown a timing diagram of a portion of the refresh sequence.

The refresh sequencer 64 accepts as input the signals DMG, MEMSEL, and P4. DMG indicates that a bus master 38 is currently executing a DMA access. MEMSEL is an address decode of memory 25 address space. P4 indicates phase 4 of a bus cycle 86 (FIG. 4), and is used by the sequencer 64 to synchronize the sequencer with the CPU 22 internal states. If MEMSEL is decoded during P4 asserted, a CPU 22 initiated memory 25 access is about to begin.

The refresh sequencer 64 provides as output the signals REF, indicating that a refresh cycle is currently in progress, REF_RAS, which is used by the signal generator 66 to provide the row address strobes on lines 57, and REF_CAS, which is used by the signal generator 66 to provide the column address strobes on lines 58.

In response to the refresh request, the refresh sequencer 64 first checks to see that no CPU or DMA transfers are currently in progress. When the input signal DMG is deasserted, and the input signals P4 and MEMSEL are simultaneously deasserted, there are no transfers of either type in progress. The sequencer 62 transitions to state 138, where the signal REF is output to indicate to the CPU sequencer 60 and DMA sequencer 62 that a refresh cycle is currently in progress. The signal REF is also used to clear the refresh request latch 132. The sequencer 64 proceeds to execute four successive conventional CAS-before-RAS refresh cycles to the memory 25. An internal counter CNT is used to keep track of the number of refresh cycles run.

The rules of arbitration between all three sequencers 60, 62, and 64, are now clear. The refresh sequencer 64 must wait for the completion of any current memory transfer before a refresh cycle may be executed; that is, CPU and DMA transfers have priority over refresh cycles. A refresh cycle is then executed immediately after the memory cycle in progress. During the refresh cycle, the CPU and DMA sequencers 60 and 62 remain in their respective idle states, suspending response to synchronous and asynchronous memory 25 accesses. Any access which is initiated during a refresh cycle is executed on completion of the refresh cycle. With such an arbitration scheme, care must be taken to ensure that no DMA device can retain control of the memory bus 30 for longer than the time between refresh requests.

A signal generator 66 is provided for combining the various signals output by the CPU sequencer 60, DMA sequencer 62, and refresh sequencer 64 into row address, column address, and write strobe control signals on lines 57, 58, and 59 as required by the DRAM comprising the memory 25. According to the embodiment shown, the memory 25 is divided into eight banks. Each bank is a contiguous memory address space consisting of 4 megabytes. A bank of memory BANK0 and a bank of memory BANK1 are permanently installed. Each of memory banks BANK0 and BANK1 includes 4 megabytes of memory organized as a longword wide (4 bytes/32 bits) data path with optional 1 bit parity associated with each byte. Memory banks BANK0 and BANK1 are implemented with 1M×4 discrete memory chips.

Also included as part of memory 25 are three SIMM (single in-line memory module) slots: slot 150, slot 152, and slot 154, for optionally installing up to six additional banks of memory: banks BANK2, BANK3, BANK4, BANK5, BANK6, and BANK7. The slots 150, 152, and 154 cover low order to high order memory addresses respectively, and are capable of supporting one or two 4M banks of memory. According to the embodiment shown, the SIMM slots 150, 152, and 154 support the installation of either 4M or 8M memory SIMMs, with the restriction that any 8M SIMMS be installed in the lowest order slots. That is, 8M SIMMS are installed in the slots corresponding to the lowest order memory address space.

The 4M and 8M SIMM technology in use at the present time does not support a read-modify-write type of memory access, where a memory location may be read and written within a single RAS - CAS memory access. The scan-erase method previously described, wherein a scan-erase access is completed within a single CPU or DMA data write transfer by executing a page-mode read of a memory 25 location followed by a page-mode write of the data in the pattern register 82 to the same memory 25 location, is therefore highly advantageous in a system like the embodiment shown. Each bank of memory 25 has associated with it a set of conventional DRAM input signals: a $RAS_x$ (row address select) input signal, a $CAS_{xy}$ (column address select) input signal, and a WE (write enable) input signal. The RAS subscript 'x' indicates the bank selected. Thus, RAS0 is associated with memory bank BANK0, $RAS_1$ with memory bank BANK1, $RAS_2$ and $RAS_3$ with SIMM slot 150 and memory banks BANK2 and BANK3, $RAS_4$ and $RAS_5$ with SIMM slot 152 and memory banks BANK4 and BANK5, and $RAS_6$ and $RAS_7$ with SIMM slot 154 and memory banks BANK6 and BANK7. The $CAS_{xy}$ signals are associated with every two memory banks in a bytewise manner; i.e. $CAS_{01}$ is associated with byte 1 of memory banks BANK0 and BANK1, while $CAS_{02}$ is associated with byte 2 of memory banks BANK2 and BANK3. The WE signal is buffered to all DRAMs. The $RAS_x$, $CAS_{xy}$, and WE signals are generated as combinatorial composites of signals generated by the CPU sequencer 60, the DMA sequencer 62, and the refresh sequencer 64, and the signal timing is dependent upon the type of access being executed.

The RAS signal generator 70 combines the CPU_RAS, DMA_RAS, and REF RAS signals from the CPU sequencer 60, DMA sequencer 62, and refresh sequencer 64 respectively, and provide as outputs the $RAS_x$ signals for the memory 25. The RAS signal generator 70 is fed as inputs the signals AS_L, REF, REF_RAS, CPU_RAS, and DMA_RAS, as well as the address and status information on lines 61. From the address and status information, the RAS signal generator 70 decodes the following signals: MEMSEL, an address decode of bitmap memory space; BANK_0, asserted for an access to memory bank BANK0 of the memory 25; BANK_1, asserted for an access to memory bank BANK1; BANK_2, asserted for an access to memory bank BANK2; BANK_3, asserted for an access to memory bank BANK3; BANK_4, asserted for an access to memory bank BANK4; BANK_5, asserted for an access to memory bank BANK5; BANK_6, asserted for an access to memory bank BANK6; BANK_7, asserted for an access to memory bank BANK7 of the memory 25. The RAS signal generator 70 provides as outputs the signals $RAS_0$, $RAS_1$, $RAS_2$, $RAS_3$, $RAS_4$, $RAS_5$, $RAS_6$, and $RAS_7$. Each $RAS_x$ output is generated as follows, where the symbols '·' and '+' conventionally indicate 'AND' and 'OR' functions respectively:

$$RAS_x = (MEM\_SEL \cdot BANK\_X \cdot /REF \cdot (CPU\_RAS \cdot AS\_L) + DMA\_RAS) + REF\_RAS$$

CPU_RAS, earlier generated by the CPU sequencer 60 in response to address decode information, is further qualified here with the address strobe signal AS_L. The qualification occurs at the last level of logic delay in order to maximize $RAS_x$ access time from the memory 25.

A CAS signal generator 72 is fed as input the signals REF, CPU_CAS, DMA_CAS, and REF_CAS, and provides as output a signal CAS according to the following logical decode:

$$CAS = /REF \cdot (CPU\_CAS + DMA\_CAS) + REF\_CAS$$

The CAS signal is further logically 'and'ed with byte mask signals BM0, BM1, BM2, and BM3 from the CPU bus 32 to generate the four sets of CAS signals, one for each 8M of DRAM, as shown in the following TABLE I:

TABLE I

|  | BANK0 BANK1 | BANK2 BANK3 | BANK4 BANK5 | BANK6 BANK7 |
|---|---|---|---|---|
| BYTE 0 | CAS00 | CAS10 | CAS20 | CAS30 |

TABLE I-continued

|        | BANK0<br>BANK1 | BANK2<br>BANK3 | BANK4<br>BANK5 | BANK6<br>BANK7 |
|--------|----------------|----------------|----------------|----------------|
| BYTE 1 | CAS01          | CAS11          | CAS21          | CAS31          |
| BYTE 2 | CAS02          | CAS12          | CAS22          | CAS32          |
| BYTE 3 | CAS03          | CAS13          | CAS23          | CAS33          |

The WE signal generator 74 is fed as inputs the signals REF, MEM_SEL, WR, DMG, ERASE, and SCAN_ERASE, and provides as output the signal CAS according to the following logical decode:

WE = /REF · (MEM_SEL · WR · /DMA · /TEST) +
MEM_SEL · /DMA · WR · TEST · ERASE +
WR · DMA · /SCAN_ERASE +
WR · DMA · SCAN_ERASE · ERASE)

The first term of the logical equation asserts the WE signal for CPU longword or quadword write transfers. The third term asserts WE for DMA write transfers of any length. The second term asserts WE for CPU diagnostic mode scan_erase transfers during the memory write portion of the transfer, and the fourth term asserts WE for DMA scan_erase transfers during the memory write portion of the cycle.

The pattern register 82 drives data onto the memory data bus 30 during the assertion of the signal ERASE during a CPU or DMA scan_erase transfer. ERASE is decoded as follows:

ERASE=CPU_ERASE+DMA_ERASE

The WE output is amplified and driven to all DRAMs of the memory 25.

The fifo data latch 80 latches data from the memory data bus 30 on the rising edge of the signal FIFO_STROBE. FIFO_STROBE is decoded as follows:

FIFO_STROBE=CPU_FIFO_STROBE+DMA_FIFO_STROBE

The address latch 75 accepts latched address bits Addr<21:4> on lines 50 to provide multiplexed DRAM address signals MA<9:0> to the memory 25 via address bus 76. Addr<2> is the lowest order address bit of a 32 bit longword. The lower order latched address bits Addr<3> and Addr<2>, are provided to the address latch 75 by the local address generator 77. The local address generator 77 is required in order to support multiple word accesses and scan-erase accesses.

For a synchronous CPU quadword read or write access, the local address generator passes Addr<3> directly to the address latch 75 from the latched address lines 50. The latched address bit Addr<2> is passed directly to the address latch 75 on the first memory access of the quadword transfer, and is then inverted for the second memory access transfer. This is done pursuant to VAX® system requirements.

For an asynchronous multiple word DMA read or write transfer, the initial address driven on Addr<3> and Addr<2> passed by the local address generator 77 to the address latch 75. Addr<3> and Addr<2> are then incremented for successive memory accesses during the transfer.

For a synchronous CPU or asynchronous DMA scan-erase transfer, Addr<3> and Addr<2> are passed by the local address generator 77 to the address latch 75 during the page mode memory read portion of the transfer. Addr<3> and Addr<2> then remain unchanged for the page mode memory write portion of the transfer.

The embodiment shown lends itself to a low cost discrete implementation; for example, the CPU sequencer 60 and DMA sequencer 62 can be implemented for example using discrete Intel® PLUS405 logic sequencer chips, and the refresh sequencer can be implemented using a 22V10 PAL device. The principles of the invention may also be implemented as part of a custom or semi-custom VLSI design.

It is apparent that, within the scope of the invention, modifications and different arrangements may be made other than as herein disclosed. The present disclosure is merely illustrative, the invention comprehending all variations thereof.

What is claimed is:

1. A DRAM memory controller for a printer, the printer having a single host CPU for providing a system clock and a state signal representing a CPU internal state, the CPU initiating data transfers synchronously to the system clock, the printer also having a DMA controller for initiating data transfers asynchronously to the system clock, the DRAM memory controller comprising:

a first sequencer comprising a logic sequencer device for providing first timing signals in response to data transfers initiated by the host CPU;

a second sequencer comprising a logic sequencer device for providing second timing signals in response to data transfers initiated by the DMA controller;

a refresh request generator for generating a refresh request signal which is asynchronous to the system clock;

a third sequencer comprising a PAL device for providing third timing signals in response to the refresh request signal, the third sequencer providing arbitration between the first, second, and third sequencers so that the first timing signals, second timing signals, and third timing signals are not activated simultaneously;

a signal generator comprising a PAL device for providing DRAM control signals in response to the first timing signals, second timing signals, and third timing signals;

a memory data bus for coupling the DRAM memory controller to a DRAM memory;

a print fifo data latch coupled to the memory data bus;

a pattern register coupled to the memory data bus;

memory data transceivers for coupling the DRAM memory controller to the host CPU and to the DMA controller; and means for controlling the memory data transceivers such that when the host CPU or the DMA controller initiates a write data transfer to a location in the DRAM memory, the DRAM memory controller executes a read data transfer from the DRAM memory location to the print fifo data latch dolowed by a write data transfer from the pattern register to the DRAM memory location without bus contention between the memory controller and the host CPU or the DMA controller.

2. A DRAM memory controller for a printer, the printer having a single host CPU connected to a DRAM memory via a CPU bus, the host CPU providing a system clock and a state signal representing a CPU internal state, the CPU initiating memory data transfers on the bus synchronously to the system clock, the printer also having a DMA controller for initiating memory data transfers on the CPU bus asynchronously to the system clock, the DRAM memory controller comprising:

a memory data bus for coupling the DRAM memory controller to the DRAM memory;

a print fifo data latch coupled to the memory data bus;

a pattern register coupled to the memory data bus;

memory data transceivers for coupling the memory data bus to the CPU bus;

a first sequencer for providing first timing signals in response to memory data transfers initiated by the host CPU, the first sequencer comprising a synchronous state machine using the system clock and responsive to the state signal;

a second sequencer for providing second timing signals in response to memory data transfers initiated by the DMA controller, the second sequencer comprising a synchronous state machine using the system clock;

a refresh request generator for generating a refresh request signal which is asynchronous to the system clock;

a third sequencer for providing third timing signals in response to the refresh request signal, the third sequencer comprising a synchronous state machine using the system clock and responsive to the state signal, the third sequencer also providing arbitration between the first, second, and third sequencers so that the first timing signals, second timing signals, and third timing signals are not activated simultaneously;

a signal generator for providing DRAM control signals in response to the first timing signals, second timing signals, and third timing signals; and means for controlling the memory data transceivers such that when the host CPU or the DMA controller executes a write to a location in the DRAM memory, the DRAM memory controller may execute a read from the DRAM memory location to the print fifo data latch followed by a write from the pattern register to the DRAM memory location without bus contention between the memory controller and the host CPU or the DMA controller.

3. A printer comprising:

a DRAM memory;

a host CPU for providing a system clock and a state signal representing a CPU internal state, the CPU initiating data transfers to the memory for filling the memory with a bitmap image to be printed, the CPU initiated data transfers being initiated synchronously to the system clock;

a print engine for receiving bitmap data and producing therefrom a printed page line by line, the print engine generating a line sync signal at the start of each line to be printed on the page;

a print fifo for providing the bitmap data to the print engine in response to the line sync signal;

a DMA controller for initiating data transfers between the memory and the print fifo when the print fifo has emptied beyond a certain predetermined point, the DMA controller initiated transfers being initiated asynchronously to the system clock;

a memory controller comprising:

a first sequencer for providing first timing signals in response to data transfers initiated by the CPU, the first sequencer comprising a synchronous state machine using the system clock;

a second sequencer for providing second timing signals in response to data transfers initiated by the DMA controller, the second sequencer comprising a synchronous state machine using the system clock;

a refresh request generator for generating a refresh request signal which is asynchronous to the system clock;

a third sequencer for providing third timing signals in response to the refresh request signal, the third sequencer comprising a synchronous state machine using the system clock, the third sequencer also providing arbitration between the first, second, and third sequencers; and a signal generator for providing DRAM control signals in response to the first timing signals, second timing signals, and third timing signals.

4. A printer comprising:

a DRAM memory;

a host CPU for providing a system clock and a state signal representing a CPU internal state, the CPU initiating data transfers to the memory for filling the memory with a bitmap image to be printed, the CPU initiated data transfers being initiated synchronously to the system clock;

a print engine for receiving bitmap data and producing therefrom a printed page line by line, the print engine generating a line sync signal at the start of each line to be printed on the page;

a print fifo for providing the bitmap data to the print engine in response to the line sync signal;

a DMA controller for initiating data transfers between the memory and the print fifo when the print fifo has emptied beyond a certain predetermined point, the DMA controller initiated transfers being initiated asynchronously to the system clock;

a DRAM memory controller comprising:

a memory data bus for coupling the DRAM memory controller to a DRAM memory;

memory data transceivers for coupling the memory data bus to the host CPU and to the DMA controller;

a print fifo data latch coupled to the memory data bus and to the print fifo;

a pattern register coupled to the memory data bus;

a first sequencer for providing first timing signals in response to data transfers initiated by the CPU, the first sequencer comprising a synchronous state machine using the system clock;

a second sequencer for providing second timing signals in response to data transfers initiated by the DMA controller, the second sequencer comprising a synchronous state machine using the system clock;

a refresh request generator for generating a refresh request signal which is asynchronous to the system clock;

a third sequencer for providing third timing signals in response to the refresh request signal, the third sequencer comprising a synchronous state machine using the system clock, the third sequencer also providing arbitration between the first, second, and third sequencers;

a signal generator for providing DRAM control signals in response to the first timing signals, second timing signals, and third timing signals; and means for controlling the memory data transceivers such that when the host CPU or the DMA controller initiates a write data transfer to a location in the DRAM memory, the DRAM memory controller executes a read data transfer from the DRAM memory location to the print fifo data latch followed by a write data transfer from the pattern register to the DRAM memory location without bus contention between the memory controller and the host CPU or the DMA controller.

5. A method of transferring data between a bitmap memory and a print fifo in a printer comprising the steps of:

providing a DMA controller;

providing a memory data bus coupled to a memory;

providing tristateable bus transceivers for coupling the DMA controller to the memory data bus;

providing a fifo data latch coupled to the memory data bus;

providing a pattern register coupled to the memory data bus;

initiating a single data write transfer to a location in the memory from the DMA controller;

tristating the bus transceivers;

reading a word of data from the location in the memory to the fifo data latch via the memory data bus using a first page-mode DRAM access; and writing data from the pattern register to the same location in the memory via the memory data bus using a second page-mode DRAM access.

* * * * *